US008177633B2

(12) United States Patent
Baerlocher et al.

(10) Patent No.: US 8,177,633 B2
(45) Date of Patent: May 15, 2012

(54) GAMING SYSTEM AND METHOD PROVIDING AN AWARD FOR DESIGNATED LOSING CONDITIONS

(75) Inventors: Anthony J. Baerlocher, Reno, NV (US); Daniel J. DeWaal, Las Vegas, NV (US); Lance R. Peterson, Reno, NV (US); Vincent P. Smith, Las Vegas, NV (US)

(73) Assignee: IGT, Reno, NV (US)

( * ) Notice: Subject to any disclaimer, the term of this patent is extended or adjusted under 35 U.S.C. 154(b) by 944 days.

(21) Appl. No.: 12/191,859

(22) Filed: Aug. 14, 2008

(65) Prior Publication Data

US 2010/0041468 A1 Feb. 18, 2010

(51) Int. Cl.
*A63F 13/00* (2006.01)

(52) U.S. Cl. ............................... 463/25; 463/20; 463/21

(58) Field of Classification Search .................... 463/20, 463/21, 25, 30–42; 273/138.1, 143 R, 292
See application file for complete search history.

(56) References Cited

U.S. PATENT DOCUMENTS 4,420,961 A 12/1983 Kusaba et al.
5,695,402 A 12/1997 Stupak
5,919,088 A 7/1999 Weiss
5,964,464 A 10/1999 Jones
6,012,982 A * 1/2000 Piechowiak et al. ............ 463/16
6,017,033 A 1/2000 Keller
6,024,642 A 2/2000 Stupak
6,053,813 A * 4/2000 Mathis ............................ 463/26
6,070,878 A 6/2000 Jones et al.
6,073,930 A 6/2000 Jones et al.
6,102,400 A 8/2000 Scott et al.
6,203,429 B1 3/2001 Demar et al.
6,203,430 B1 3/2001 Walker et al.
6,206,374 B1 3/2001 Jones
6,234,895 B1 5/2001 Jones et al.
(Continued)

FOREIGN PATENT DOCUMENTS

EP 0 978 809 2/2000
(Continued)

OTHER PUBLICATIONS

The Promise of an Ever-Expanding Market Article [online] [retrieved on Feb. 15, 2008]. Retrieved from the Internet at <URL: www.aruze.com/en/company/profile/profile2007_pdf/20_21.pdf>.

(Continued)

*Primary Examiner* — Masud Ahmed
(74) *Attorney, Agent, or Firm* — K&L Gates LLP

(57) ABSTRACT

The gaming system and method disclosed herein provides an award to one or more players for a non-occurrence of a designated event. The gaming system monitors a plurality of games played at a plurality of gaming devices. If the designated event occurs, the gaming system resets an event counter associated with tracking the non-occurrence of the designated event. If the designated event does not occur, the gaming system: (i) increments the event counter to account for the non-occurrence of the designated event, and (ii) determines if the quantity of games played since the last event occurred at least equals a predetermined quantity of games played. If the quantity of games played since the last event occurred at least equals the predetermined quantity, the gaming system provides one or more of the players an award for the non-occurrence of the designated event.

26 Claims, 13 Drawing Sheets

U.S. PATENT DOCUMENTS

| | | | | |
|---|---|---|---|---|
| 6,261,178 | B1 | 7/2001 | Bennett | |
| 6,287,194 | B1 | 9/2001 | Okada et al. | |
| 6,308,953 | B1 | 10/2001 | Nagano | |
| 6,312,330 | B1 | 11/2001 | Jones et al. | |
| 6,334,814 | B1 | 1/2002 | Adams | |
| 6,336,859 | B2 | 1/2002 | Jones et al. | |
| 6,358,146 | B1 | 3/2002 | Adams | |
| 6,375,189 | B1 | 4/2002 | Jones | |
| 6,375,569 | B1 | 4/2002 | Acres | |
| 6,386,974 | B1 | 5/2002 | Adams | |
| 6,416,406 | B1 | 7/2002 | Duhamel | |
| 6,494,785 | B1 | 12/2002 | Gerrard et al. | |
| 6,561,903 | B2 | 5/2003 | Walker et al. | |
| 6,599,193 | B2 | 7/2003 | Baerlocher et al. | |
| 6,612,927 | B1 | 9/2003 | Slomiany et al. | |
| 6,663,488 | B1 | 12/2003 | Adams | |
| 6,709,332 | B2 | 3/2004 | Adams | |
| 6,722,975 | B2 | 4/2004 | Duhamel | |
| 6,722,976 | B2 | 4/2004 | Adams | |
| 6,773,345 | B2 | 8/2004 | Walker et al. | |
| 6,786,820 | B2 | 9/2004 | Gerrard et al. | |
| 6,802,773 | B2 | 10/2004 | Moody | |
| 6,808,454 | B2 | 10/2004 | Gerrard et al. | |
| 6,854,012 | B1 | 2/2005 | Taylor | |
| 6,869,362 | B2 | 3/2005 | Walker et al. | |
| 6,893,018 | B2 | 5/2005 | Inoue | |
| 6,893,344 | B2 | 5/2005 | Brown et al. | |
| 6,939,230 | B2 | 9/2005 | Vancura | |
| 6,971,953 | B2 | 12/2005 | Gerrard et al. | |
| 6,984,173 | B1 * | 1/2006 | Piechowiak et al. | 463/20 |
| 6,984,174 | B2 | 1/2006 | Cannon et al. | |
| 7,040,985 | B2 | 5/2006 | Vancura | |
| 7,056,215 | B1 | 6/2006 | Olive | |
| 7,192,352 | B2 | 3/2007 | Walker et al. | |
| 7,267,613 | B2 | 9/2007 | Cole | |
| 7,314,408 | B2 | 1/2008 | Cannon | |
| 7,322,887 | B2 | 1/2008 | Belger et al. | |
| 7,351,146 | B2 | 4/2008 | Kaminkow | |
| 7,357,716 | B2 | 4/2008 | Marks et al. | |
| 7,374,480 | B2 | 5/2008 | Otani et al. | |
| 7,390,255 | B2 | 6/2008 | Walker et al. | |
| 7,393,279 | B2 | 7/2008 | Walker et al. | |
| 7,931,530 | B2 * | 4/2011 | Anderson et al. | 463/20 |
| 7,985,128 | B2 * | 7/2011 | Fong | 463/16 |
| 2001/0009865 | A1 | 7/2001 | Demar et al. | |
| 2001/0054794 | A1 | 12/2001 | Cole et al. | |
| 2002/0151346 | A1 | 10/2002 | Devaull | |
| 2002/0187834 | A1 | 12/2002 | Rowe et al. | |
| 2003/0027626 | A1 | 2/2003 | Marks et al. | |
| 2003/0153382 | A1 | 8/2003 | Vancura | |
| 2003/0211883 | A1 | 11/2003 | Potts | |
| 2003/0216166 | A1 | 11/2003 | Baerlocher et al. | |
| 2003/0236111 | A1 | 12/2003 | Otani et al. | |
| 2003/0236115 | A1 | 12/2003 | Chamberlain | |
| 2004/0014521 | A1 * | 1/2004 | Seelig et al. | 463/20 |
| 2004/0048644 | A1 | 3/2004 | Gerrard et al. | |
| 2005/0159200 | A1 | 7/2005 | Nicely et al. | |
| 2006/0025195 | A1 | 2/2006 | Pennington et al. | |
| 2006/0030403 | A1 | 2/2006 | Lafky et al. | |
| 2006/0131395 | A1 | 6/2006 | Potts et al. | |
| 2006/0172796 | A1 | 8/2006 | Vancura | |
| 2006/0183530 | A1 | 8/2006 | Ellis | |
| 2006/0183535 | A1 | 8/2006 | Marks et al. | |
| 2007/0054733 | A1 | 3/2007 | Baerlocher | |
| 2007/0060271 | A1 | 3/2007 | Cregan et al. | |
| 2007/0060314 | A1 | 3/2007 | Baerlocher et al. | |
| 2007/0060321 | A1 | 3/2007 | Vasquez et al. | |
| 2007/0184887 | A1 | 8/2007 | Cannon | |
| 2007/0191088 | A1 | 8/2007 | Breckner et al. | |
| 2007/0218975 | A1 | 9/2007 | Iddings et al. | |
| 2007/0218982 | A1 | 9/2007 | Baerlocher | |
| 2007/0298874 | A1 | 12/2007 | Baerlocher et al. | |
| 2007/0298875 | A1 | 12/2007 | Baerlocher et al. | |
| 2008/0020832 | A1 | 1/2008 | Iddings et al. | |
| 2008/0020833 | A1 | 1/2008 | Baerlocher et al. | |
| 2008/0020834 | A1 | 1/2008 | Breckner et al. | |
| 2008/0020846 | A1 | 1/2008 | Vasquez et al. | |
| 2008/0039191 | A1 | 2/2008 | Cuddy | |
| 2008/0058050 | A1 | 3/2008 | Okada | |
| 2008/0058066 | A1 | 3/2008 | Okada | |
| 2008/0064473 | A1 | 3/2008 | Okada | |
| 2008/0064474 | A1 | 3/2008 | Okada | |
| 2008/0064475 | A1 | 3/2008 | Okada | |
| 2008/0064476 | A1 | 3/2008 | Okada | |
| 2008/0076514 | A1 | 3/2008 | Baerlocher et al. | |
| 2008/0076515 | A1 | 3/2008 | Baerlocher et al. | |
| 2008/0076517 | A1 | 3/2008 | Baerlocher et al. | |
| 2008/0076552 | A1 | 3/2008 | Baerlocher et al. | |
| 2008/0090651 | A1 | 4/2008 | Baerlocher | |
| 2008/0096632 | A1 | 4/2008 | Okada | |
| 2008/0098446 | A1 | 4/2008 | Seckin et al. | |
| 2008/0102922 | A1 | 5/2008 | Okada | |
| 2008/0102930 | A1 | 5/2008 | Okada | |
| 2008/0108410 | A1 | 5/2008 | Baerlocher | |
| 2008/0108423 | A1 | 5/2008 | Benbrahim et al. | |
| 2008/0108430 | A1 | 5/2008 | Evans | |
| 2008/0108431 | A1 | 5/2008 | Cuddy et al. | |
| 2008/0113779 | A1 | 5/2008 | Cregan | |
| 2008/0119259 | A1 | 5/2008 | Okada | |
| 2008/0119262 | A1 | 5/2008 | Okada | |
| 2008/0125216 | A1 | 5/2008 | Okada | |
| 2008/0139287 | A1 | 6/2008 | Okada | |
| 2008/0139291 | A1 | 6/2008 | Okada | |
| 2008/0146310 | A1 | 6/2008 | Okada | |
| 2008/0153571 | A1 | 6/2008 | Okada | |
| 2008/0161090 | A1 * | 7/2008 | Okada | 463/20 |

FOREIGN PATENT DOCUMENTS

| | | |
|---|---|---|
| EP | 1 079 344 | 2/2001 |
| EP | 1 304 668 | 4/2003 |
| EP | 1 540 607 | 12/2006 |
| WO | WO 00/32286 | 6/2000 |

OTHER PUBLICATIONS

You Need to Know More About . . . Aruze Gaming America, Rescuing Players, Reaping Rewards Article, written by Marian Green, published by Slot Manager in May/Jun. 2008 issue.

* cited by examiner

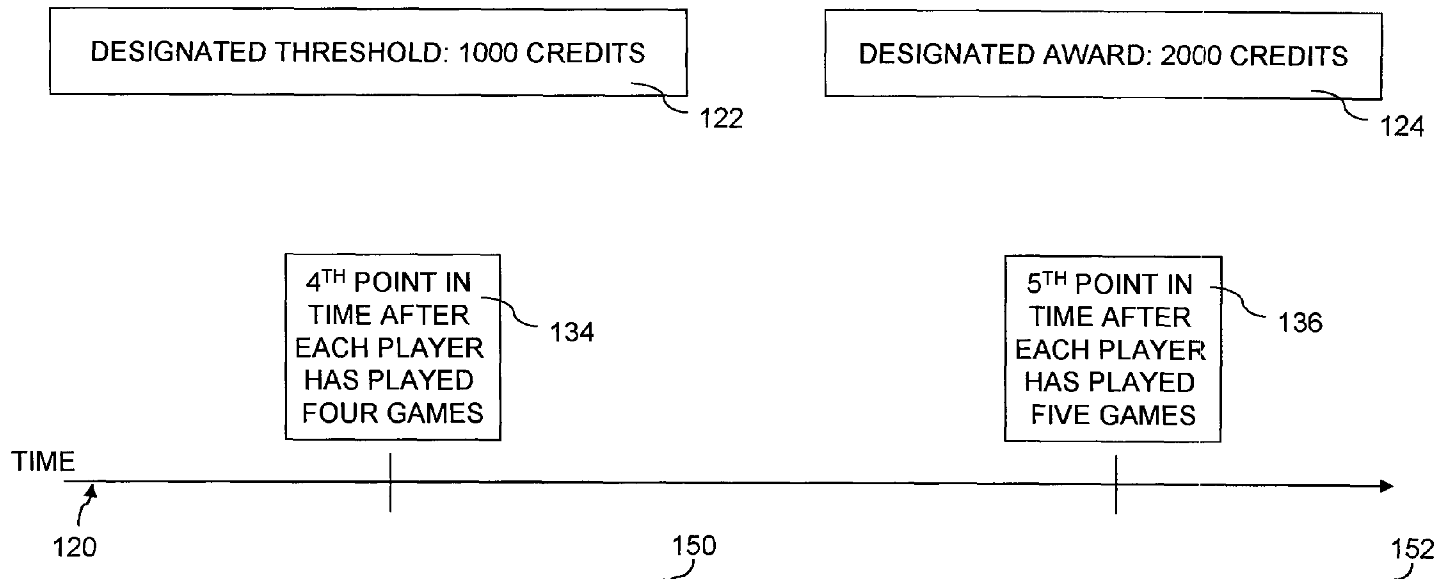

| PLAYER | CREDITS | AWARD PROVIDED | POINTS ACCUMULATED |
|---|---|---|---|
| A | 146 | 0 | 70 |
| B | 1096 | 1000 | 0 |
| C | 346 | 0 | 63 |
| COUNTER: 0 | | | |
| Player B won 1000 credits, which at least equals the designated threshold. The points accumulated by Player B and the counter have been reset to zero because the designated threshold has been met. Players A and C accumulated 20 points. | | | |

| PLAYER | CREDITS | AWARD PROVIDED | POINTS ACCUMULATED |
|---|---|---|---|
| A | 395 | 250 | 73 |
| B | 1095 | 0 | 20 |
| C | 445 | 100 | 68 |
| COUNTER: 3 | | | |
| Players A won 250 credits and accumulated 3 points. Player B accumulated 20 points. Player C won 100 credits and accumulated 5 points. The designated threshold is not met and the counter increments to 1. | | | |

FIG. 4C

220

| PLAYER | POINTS ACCUMULATED WHEN EVENT COUNTER REACHES DESIGNATED THRESHOLD | PROBABILITY TO WIN THE DESIGNATED AWARD |
|---|---|---|
| A | 1741 | 35% |
| B | 1560 | 31% |
| C | 1678 | 34% |

FIG. 6A

230

| PLAYER | POINTS ACCUMULATED WHEN EVENT COUNTER REACHES DESIGNATED THRESHOLD | RELATIVE PORTION OF THE DESIGNATED AWARD |
|---|---|---|
| A | 1741 | 35% |
| B | 1560 | 31% |
| C | 1678 | 34% |

FIG. 6B

240

| GROUPS OF PLAYERS | PLAYS OF GAMES FOR WHICH THE DESIGNATED EVENT DID NOT OCCUR WHEN EVENT COUNTER REACHES DESIGNATED THRESHOLD | PROBABILITY TO WIN THE DESIGNATED AWARD |
|---|---|---|
| A | 320 | 50% |
| B | 275 | 30% |
| C | 185 | 20% |

FIG. 6C

250

| TEAMS: PLAYERS | POINTS ACCUMULATED BEFORE THE EVENT COUNTER REACHES DESIGNATED THRESHOLD | PROBABILITY TO WIN THE DESIGNATED AWARD |
|---|---|---|
| Team A: | 360 | 50% |
| Player 1 | 180 | 50.00% of Team A Award |
| Player 2 | 120 | 33.33% of Team A Award |
| Player 3 | 60 | 16.67% of Team A Award |
| Team B: | 300 | 30% |
| Player 4 | 125 | 41.67% of Team B Award |
| Player 5 | 125 | 41.67% of Team B Award |
| Player 6 | 50 | 16.67% of Team B Award |
| Team C: | 240 | 20% |
| Player 7 | 80 | 33.33% of Team C Award |
| Player 8 | 80 | 33.33% of Team C Award |
| Player 9 | 80 | 33.33% of Team C Award |

FIG. 6D

GAMING SYSTEM AND METHOD PROVIDING AN AWARD FOR DESIGNATED LOSING CONDITIONS

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and based on the amount of the wager (e.g., the higher the wager, the higher the award). Symbols or symbol combinations which are less likely to occur usually provide higher awards.

In such known gaming machines, the amount of the wager made on the base game by the player may vary. For instance, the gaming machine may allow the player to wager a minimum number of credits, such as one credit (e.g., one cent, nickel, dime, quarter or dollar) up to a maximum number of credits, such as five credits. This wager may be made by the player a single time or multiple times in a single play of a primary game. For instance, a slot game may have one or more paylines and the slot game may allow the player to make a wager on each payline in a single play of the primary game. Slot games with 1, 3, 5, 9, 15 and 25 lines are widely commercially available. Thus, it is known that a gaming machine, such as a slot game, may allow players to make wagers of substantially different amounts on each play of the primary or base game ranging, for example, from one credit up to 125 credits (e.g., five credits on each of 25 separate paylines). This is also true for other wagering games, such as video draw poker, where players can wager one or more credits on each hand and where multiple hands can be played simultaneously.

Secondary or bonus games are also known in gaming machines. The secondary or bonus games usually provide an additional award to the player. Secondary or bonus games usually do not require an additional wager by the player to be activated. Secondary or bonus games are generally activated or triggered upon an occurrence of a designated triggering symbol or triggering symbol combination in the primary or base game. For instance, a bonus symbol occurring on the payline on the third reel of a three reel slot machine may trigger the secondary bonus game. When a secondary or bonus game is triggered, the gaming machines generally indicates this to the player through one or more visual and/or audio output devices, such as the reels, lights, speakers, video screens, etc. Part of the enjoyment and excitement of playing certain gaming machines is the occurrence of the secondary or bonus game (even before the player knows how much the bonus award will be).

Progressive awards are also known. In one form, a known progressive award includes an initial amount funded by a casino and an additional amount funded through a portion of each wager made on the progressive gaming machine. For example, 1% of each wager placed on the primary game of the gaming machine may be allocated to the progressive award or progressive award fund. The progressive award grows in value as more players play the gaming machine and more portions of the players' wagers are allocated to the progressive award. When a player obtains a winning symbol or symbol combination which results in the progressive award, the accumulated progressive award is provided to the player. After the progressive award is provided to the player, the amount of the next progressive award is reset to the initial value and a portion of each subsequent wager is allocated to that next progressive award as described above.

While such progressive awards are popular amongst players, a number of issues exist with these known progressive award gaming systems. For example, when a progressive award is provided at another gaming machine, a player may feel deflated and not wish to continue playing for a base or reset level progressive award. Such feelings can lead to certain players walking away with jackpot fatigue. That is, jackpot fatigue can occur when a player no longer finds an award desirable or worth the cost of continuing to play. This desire to quit playing is also due to the fact that a player may feel they must wait a substantial period of time for the progressive award to climb back to a relatively high value that the player feels is worth trying to win.

There is a continuing need to provide new and different gaming machines and gaming systems as well as new and different ways to provide awards to players including bonus awards and progressive awards. There is also a continuing need to provide new and different linked or related gaming machines.

SUMMARY

The gaming system and method disclosed herein provides each of a plurality of players playing at a plurality of gaming devices in the gaming system with an opportunity to win an award if a designated event does not occur or if a designated condition is not satisfied. In one embodiment, the gaming system monitors each of the plays of each of the gaming devices to determine if the designated event has occurred. If the designated event has occurred, the gaming system resets an event counter associated with or for tracking the non-occurrence of this designated event. If the designated event has not occurred, the gaming system increments the event counter to account for the non-occurrence of the designated event. At every designated interval (such as a play of a primary game) where the designated event has not occurred, the gaming system further determines if the quantity of games played since the last event occurred (or if an amount of time since the last event occurred) at least equals a designated quantity of games played (or a designated amount of time). If the quantity of games played (or if an amount of time) since the last event occurred does not equal the designated quantity of games played (or the designated amount of time), the gaming system continues monitoring the games played at the gaming devices for the occurrence or non-occurrence of the designated event. On the other hand, if the quantity of games played (or if the amount of time) since the last event occurred at least equals the designated quantity of games played (or the designated amount of time), the gaming system provides one or more of the players an award for the non-occurrence of the designated event.

In one embodiment, the gaming system provides the award associated with a non-occurrence of a designated event to one of the players. In another embodiment, the gaming system divides the award associated with the non-occurrence of the designated event between a plurality of players. In one such embodiment, the gaming system provides the award associated with the non-occurrence of the designated event to one or more of the players based on a point system. In one such embodiment, the gaming system monitors or tracks each game played at each of the gaming devices and determines whether a point accumulation event occurs in association with one of the games played at one of the gaming devices. In one embodiment, the gaming system provides the award associated with the non-occurrence of the designated event to the player who accumulated the most points when the event counter reaches the designated quantity. In another embodiment, the gaming system divides or splits the award associated with the non-occurrence of the designated event between a plurality of players based on the quantity of points accumulated by each of the players. For example, the gaming system provides the player who accumulated the most points when the event counter reached the designated quantity with a first portion of the award. In this example, the gaming system also provides the player who accumulated the second most points when the event counter reached the designated quantity with a second portion of the award, wherein the second portion is lower than the first portion. In another embodiment, for a plurality of players, the gaming system determines if each player wins the award associated with the non-occurrence of the designated event, wherein the determination for each player is based on that player's relative quantity of points accumulated.

It should be appreciated that after the event counter reaches the designated quantity, the central controller may or may not provide the award associated with the non-occurrence of the designated event (or a portion of such award) to the player or players who participated in a majority of the plays or games for which the designated event did not occur. In one embodiment, after the event counter reaches the designated quantity, the gaming system determines which player or players have played the most plays or games without the designated event occurring and determines whether to provide the award associated with the non-occurrence of the designated event based on which player or players have played the most plays or games without the designated event occurring. For example, a first range or group of players who have played a first quantity of games without the designated event occurring (e.g., twenty or more) is associated with a first chance (e.g., 75% chance) of winning the award and a second, different range or group of players who have played a second, different quantity of games without the designated event occurring (e.g., nineteen or less) is associated with a second, different chance (e.g., 25% chance) of winning the award.

In one embodiment, the gaming system provides the players with an opportunity to win an award (e.g., an award of $2500) if a designated event (e.g., a win of at least $1000) does not occur in a predetermined quantity of games played (e.g., 1000 games). That is, if none of the players win an award of $1000 or more in 1000 games played at the gaming devices, the gaming system provides an award of $2500 to one or more of the players. In this example embodiment, the gaming system monitors each of the games played at each of the gaming devices to determine if one of the players has won an award at least equal to $1000. In this example embodiment, the gaming system increments an event counter for each game played that results in one of the players winning an award less than $1000 (i.e., a non-occurrence of the event of a win of at least $1000). The gaming system monitors the games played until the event counter increments to 1000 games played at which point the gaming system provides the award of $2500 to one or more of the players. On the other hand, if one of the players wins an award of at least $1000, the gaming system resets the event counter to an initial quantity of games played or changes the event counter by a designated quantity of games (e.g., 500). It should be appreciated that the gaming system may monitor or track any suitable event or condition and provide a plurality of players with an opportunity to win any suitable award associated with an occurrence or a non-occurrence of such tracked event or condition.

In one embodiment, the gaming system provides each player with a quantity of points based on one or more point accumulation events. For example, in one embodiment, the point accumulation event is based on an amount wagered by one of the players at one of the gaming devices. In another embodiment, the point accumulation event is based on an outcome generated for one of the games played at one of the gaming devices. In different embodiments, the gaming system provides points based on any suitable point accumulation event, such as one of the players obtaining a designated number of wins or sustaining a designated number of losses. In different embodiments, the gaming system accumulates points for the player in association with the player's account, the player's player tracking card, the gaming device played by the player, or a team including the player.

In one embodiment, different point accumulation events are associated with different numbers of points and different game outcomes. For example, if a first point accumulation event occurs in association with one of the games played, the gaming system provides a first award value, such as $0, and a first quantity of points, such as twenty points, to the player at the gaming device associated with the first point accumulation event. If a second, different point accumulation event occurs in association with one of the games played, the gaming system provides a second award value, such as $50, and a second, different quantity of points, such as ten points, to the player at the gaming device associated with the second point accumulation event. If a third, different point accumulation event occurs in association with one of the games played, the gaming system provides a third award value, such as $500, a third different quantity of points, such as zero points, to the player at the gaming device associated with the third point accumulation event. In this embodiment, the gaming system accounts for: (i) each one of the games played in which the designated event occurs or does not occur, and (ii) a quantity of points accumulated by each player for the games played at each of the gaming devices. In one such embodiment, the gaming system increments an event counter to account for each of the games played which do not result in the designated event (e.g., an award value less than $500) and increments a point meter to account for the quantity of points accumulated by each of the players.

In one embodiment, the award associated with a non-occurrence of the designated event is a progressive award. In one such embodiment, the gaming system provides one or more players the progressive award if a designated event does not occur (e.g., a win of at least a designated value) within a predetermined quantity of games or within a designated time. It should be appreciated that the gaming system and method disclosed herein provide players an opportunity to win relatively high awards while the progressive award associated with the non-occurrence of a designated event grows to large values. That is, as players win relatively large awards, the event counter resets. The progressive award is not provided when the event counter resets. Thus, if players win relatively large awards, the event counter frequently resets and the progressive award continues to grow in value. Accordingly, player excitement increases because the players are winning relatively large awards simultaneously with the progressive award growing to large values.

One advantage of the disclosed gaming system and method is to provide a plurality of players with an opportunity to win: (i) an award for the occurrence of a designated event, and (ii) an award for the non-occurrence of the designated event within a designated quantity of games played (or a designated amount of time).

Additional features and advantages are described herein, and will be apparent from the following Detailed Description and the figures.

BRIEF DESCRIPTION OF THE FIGURES

FIGS. 4A, 4B, 4C and 4D are schematic diagrams illustrating a timeline of a plurality of events which can occur in accordance with one embodiment of the disclosed gaming system.

FIGS. 6A, 6B, 6C and 6D are schematic diagrams illustrating an award which can be provided partially or entirely to one or more players in accordance with one embodiment of the disclosed gaming system.

DETAILED DESCRIPTION

The present disclosure may be implemented in various configurations for gaming machines, gaming devices, or gaming systems, including but not limited to: (1) a dedicated gaming machine, gaming device, or gaming systems wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
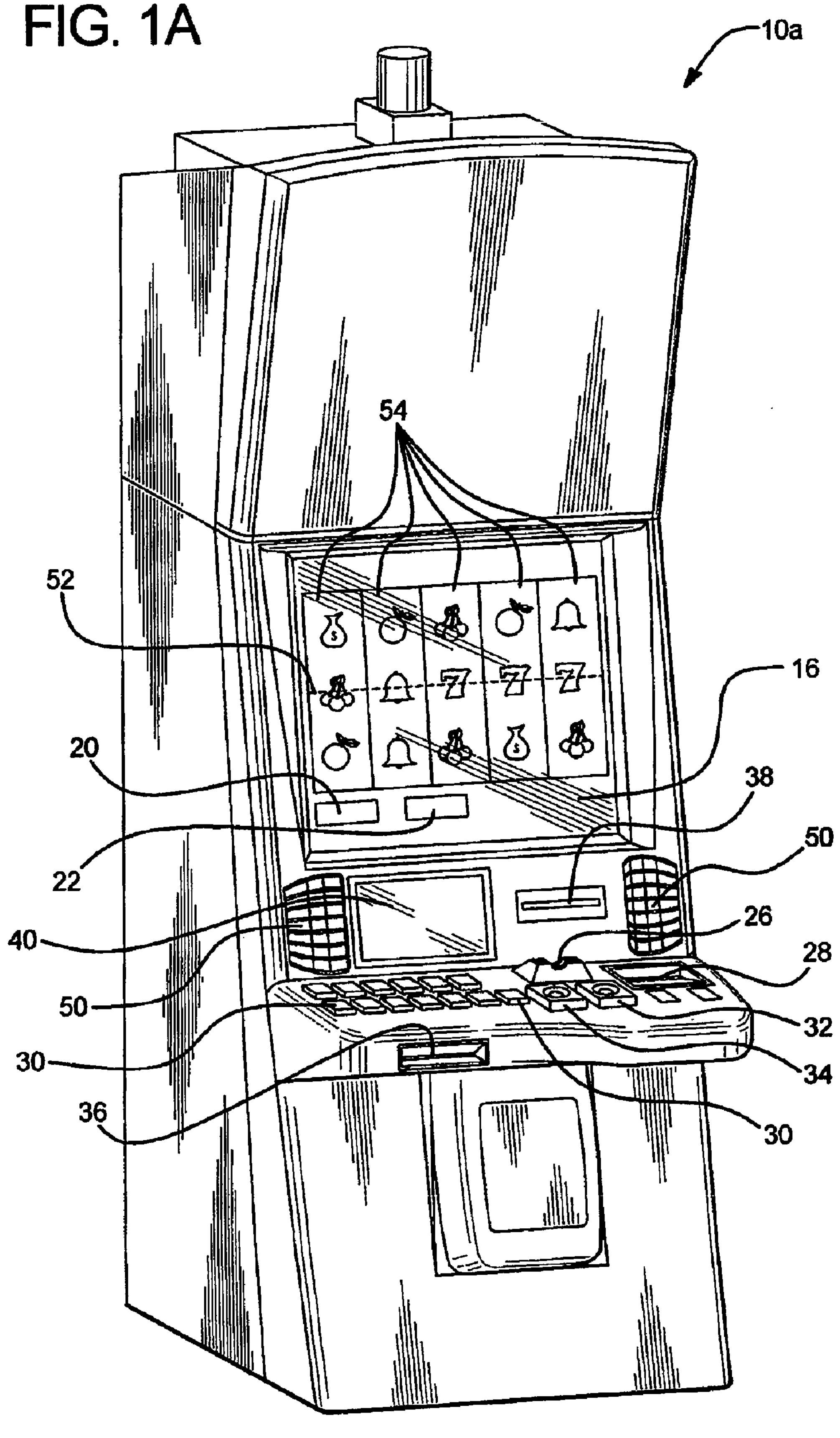
FIGS. 1A and 1B are perspective views of example alternative embodiments of the gaming device of the present disclosure.
Figure 1B:
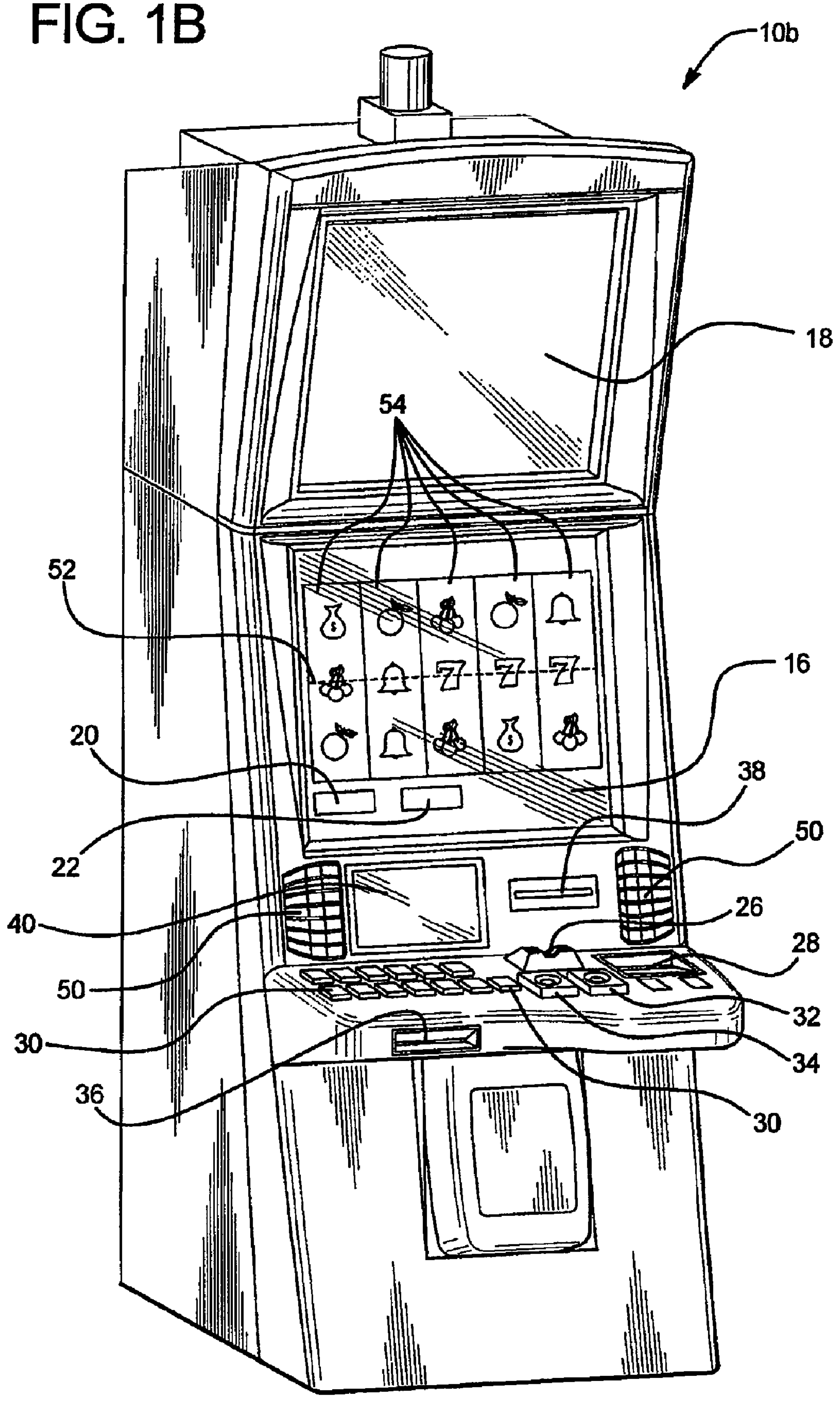

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
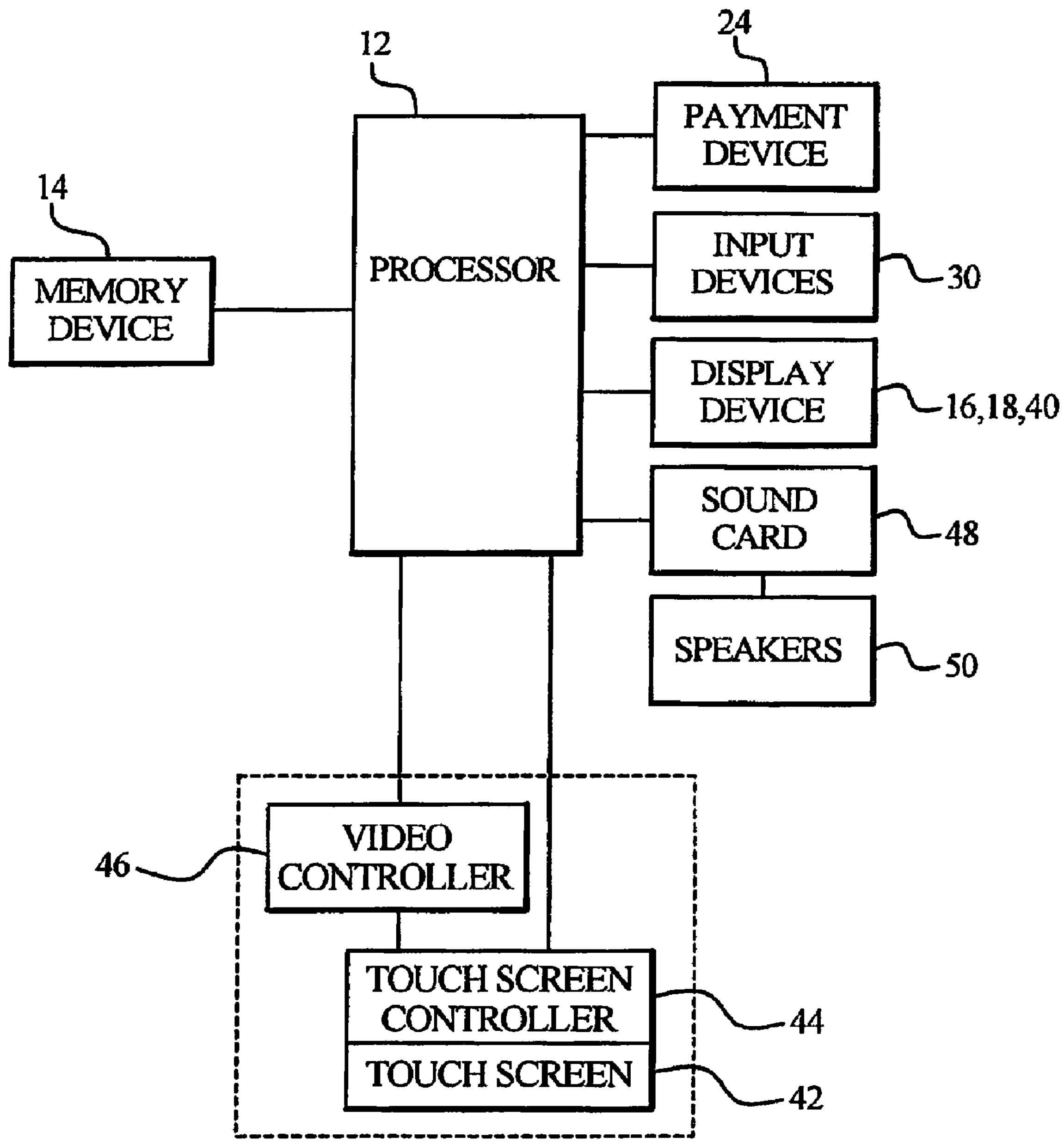
FIG. 2A is a schematic block diagram of one embodiment of an electronic configuration for one of the gaming devices disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, for example part of a wireless gaming system. In this embodiment, the gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance, or the equivalent. In one embodiment, the gaming device includes a bet display 22 which displays a player's amount wagered. In one embodiment, as described in more detail below, the gaming device includes a player tracking display 40 which displays information regarding a player's play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data), and other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering game as the primary or base game. The gaming machine or device may include some or all of the features of conventional gaming machines or devices. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the players wager, a reel is not activated, then a designated number of default symbol positions, such as a single symbol position of the middle row of the reel, will be activated and the default symbol position(s) will be part of one or more of the ways to win. This type of gaming machine enables a player to wager on one, more than one or all of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel).

In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, a base or primary game may be a keno game wherein the gaming device displays a plurality of selectable indicia or numbers on at least one of the display devices. In this embodiment, the player selects at least one bit potentially a plurality of the selectable indicia or numbers via an input device such as a touch screen. The gaming device then displays a series of drawn numbers and determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or in a bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
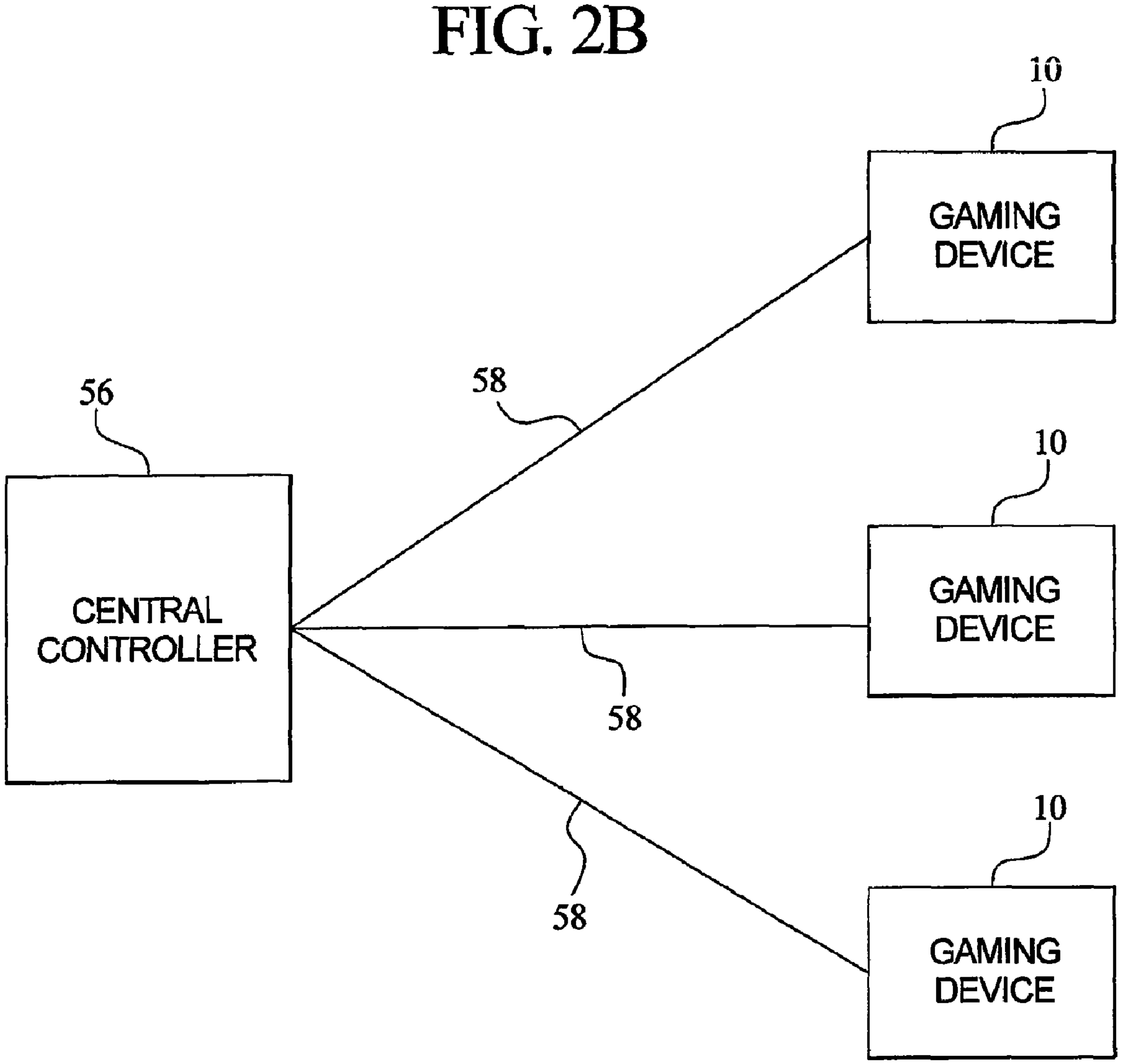
FIG. 2B is a schematic block diagram of one embodiment of a gaming system network configuration including a plurality of gaming devices disclosed herein.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno, or lottery game is not displayed to the player, but the results of the bingo, keno, or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game, and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables, different wager denominations or different themes. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Awards for Non-Occurring Events or Non-Satisfied Conditions

In one embodiment, a plurality of players at a plurality of linked gaming devices play for one or more awards wherein at least one of the awards is provided if a designated event does not occur or if a designated condition is not satisfied. In one embodiment, the gaming system tracks each game played at each of the gaming devices and determines if the designated event has occurred. If the designated event has occurred, the gaming system resets an event counter associated with tracking the non-occurrence of this designated event. If the designated event has not occurred, the gaming system increments the event counter to account for the non-occurrence of the designated event. The gaming system determines whether the event counter is at least equal to a designated threshold. In one embodiment, the designated threshold is a designated quantity of games played. If the quantity of games played since the last event occurred at least equals the designated quantity of games played. If the quantity of games played since the last event occurred does not equal the designated quantity of games played, the gaming system continues tracking the games played at the gaming devices for the occurrence or the non-occurrence of the designated event. On the other hand, if the quantity of games played since the last event occurred at least equals the designated quantity of games played, the gaming system provides one or more of the players the award for the non-occurrence of the designated event.

The central controller of the gaming system tracks each of the plays of each of a group of gaming devices during a qualifying period. In one embodiment, the qualifying period is based on a number of games. In another embodiment, the qualifying period is based on an amount of coin-in. In one embodiment, the qualifying period is based on a number of credits won or coin-out. In another embodiment, the qualifying period is based on a player or gaming device reaching a designated outcome. In one embodiment, the qualifying period is based on an amount of time. In another embodiment, the qualifying period includes a player or gaming device reaching a specified number of points earned during game play.

Figure 3:
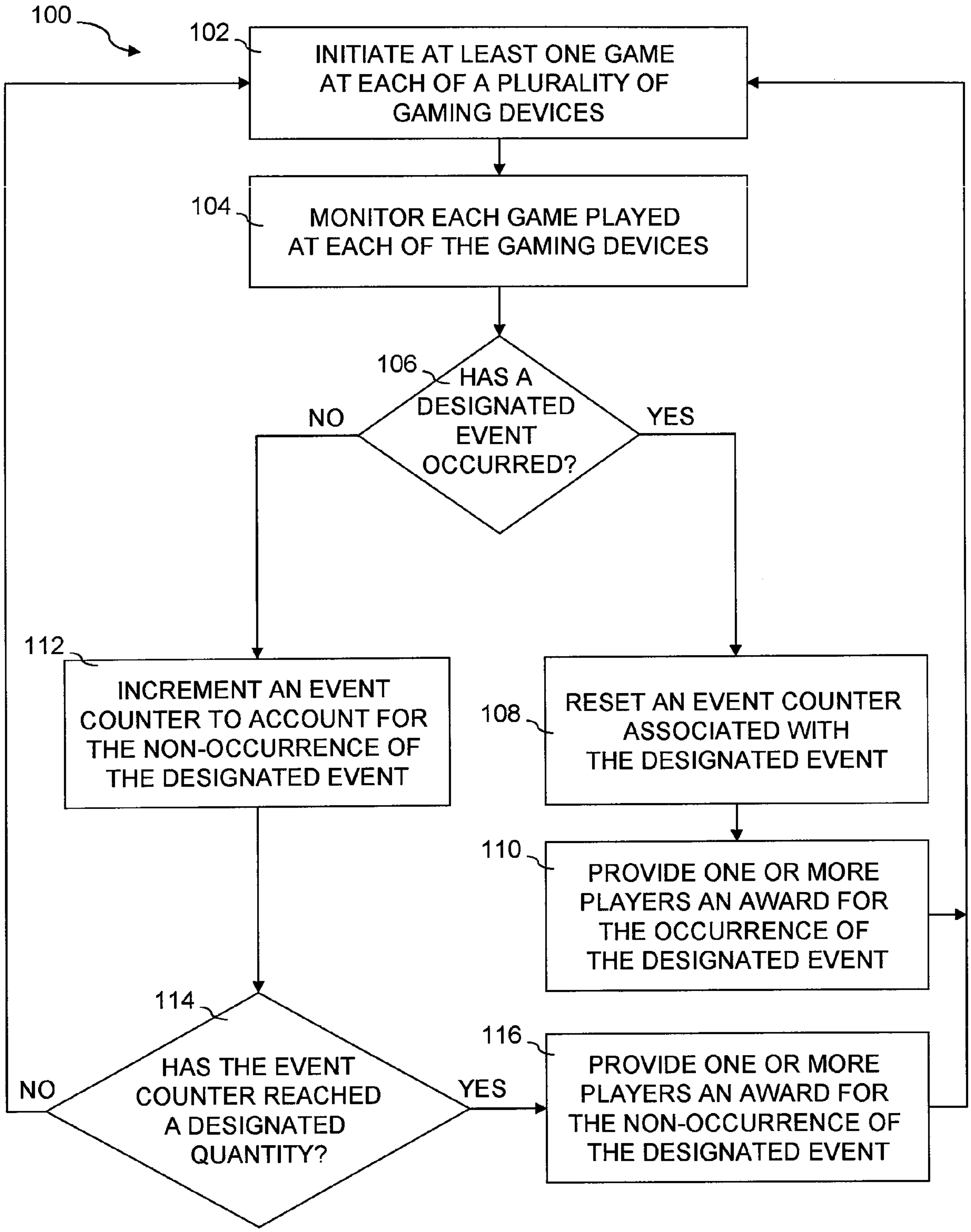
FIG. 3 is a process flow diagram showing one possible flow sequence of one embodiment of the disclosed gaming system.

Referring now to FIG. 3, a flowchart of an example process 100 of one embodiment is illustrated. The gaming system of this embodiment enables a plurality of players at a plurality of linked gaming devices to play for one or more awards associated with a non-occurrence of a designated event. In one embodiment, the process 100 is embodied in one or more software programs stored in one or more memories and executed by one or more processors or controllers. Although the process 100 is described with reference to the flowchart illustrated in FIG. 3, it should be appreciated that many other methods of performing the steps associated with process 100 may be used. For example, the order of many of the blocks may be changed, and many of the blocks described may be optional.

The process 100 begins when a player places a primary wager for a primary game at one of the gaming devices 10 in the gaming system. After the player's wager, the gaming device initiates a game as indicated by block 102. In one embodiment, the central server of the gaming system communicates with the gaming device processor of the gaming device to initiate the game. The gaming devices 10 in the gaming system can initiate a plurality of primary games. In one embodiment, the primary games are the same for each of the gaming devices. In different embodiments, at least two of the primary games are different based on: (i) a game type, (ii) a game denomination or accepted wager amount, (iii) a paytable associated with the primary game, (iv) a game code or logic associated with the primary game, (v) a geographic location, or (vi) any combination of the above. In another embodiment, at least two of gaming machines are configured to initiate the same primary game.

In one embodiment, the central server monitors or tracks each of the plays of a game at each of the gaming devices to determine if a designated event has occurred or if a designated condition has been satisfied in association with the tracked plays of the game, as indicated by block 104. In one embodiment, the central controller maintains an event counter or meter for the gaming system. In one embodiment, each of the gaming machines is associated with an independent event counter to track the play of that gaming device. In one embodiment, the gaming system maintains an individual event counter or meter for each of the players. In one such embodiment, the central controller of the gaming system individually tracks each non-occurrence of the designated event and stores each non-occurrence of the designated event in association with each player's player tracking card. In one such embodiment, the central server communicates information or messages indicating one of the player's account information including any tracked non-occurrences of the designated event to the gaming device being played by that player.

In one embodiment, the designated event occurs or the designated condition is satisfied when a suitable threshold is met or exceeded. For example, a designated event occurs when one of the gaming devices in the gaming system provides an award to one of the players having a value at least equal to a threshold value. In this example, if one of the players achieves a winning outcome that is associated with an award greater than or equal to a predetermined amount (e.g., $1000 or 1000 credits), the central server determines that the designated event has occurred. In another embodiment, the designated event is a designated outcome, such as four of a kind in a poker game, or if the designated outcome appears along a payline of one of the gaming devices. In another example, the designated condition is satisfied when a suitable threshold is met or exceeded. For example, if one of the players places a wager of a minimum amount (e.g., $3) and wins an award greater than or equal to a threshold value (e.g., $1000 or 1000 credits), the central server determines that the designated condition has been satisfied.

In different embodiments, the designated events or conditions which are tracked or monitored include, but are not limited to:

(1) a deposit of an amount of funds at one or more of the gaming devices;

(2) an identification of a player (or a designated player) at one or more of the gaming devices;

(3) any player (or a designated player) placing one or more wagers (regardless of the wager amount);

(4) any player (or a designated player) placing one or more side-wagers (regardless of the side-wager amount);

(5) any player (or a designated player) wagering on a number of paylines for one or more games;

(6) any player (or a designated player) wagering on a designated payline for one or more games;

(7) any player (or a designated player) wagering on a number of ways to win for one or more games;

(8) any player (or a designated player) engaging an input device of one of the gaming devices to cause a generation of an outcome;

(9) one or more activations of a reel (or a designated reel);

(10) one or more activations of a plurality of reels;

(11) one or more generations of any outcome (or a designated outcome);

(12) one or more generations of a winning outcome (or a designated winning outcome) from a plurality of winning outcomes;

(13) one or more generations of any outcome (or a designated outcome) associated with at least one award;

(14) one or more generations of any outcome (or a designated outcome) associated with at least one award over a designated value;

(15) one or more generations of an outcome (or a designated outcome) on at least one designated payline for one or more games;

(16) one or more generations of an outcome (or a designated outcome) in a scatter configuration for one or more games;

(17) one or more generations of a winning way to win (or a designated winning way to win) for one or more games;

(18) one or more generations of a designated symbol or symbol combination for one or more games;

(19) one or more generations of a designated symbol or symbol combination on a designated payline for one or more games;

(20) one or more generations of a designated symbol or symbol combination in a scatter configuration for one or more games;

(21) one or more eligible gaming devices providing any player (or a designated player) at least one award amount for one or more games;

(22) a triggering of one or more plays of a secondary game;

(23) one or more activations of a secondary display (such as an award generator);

(24) one or more activations of a community award generator;

(25) one or more generations of any outcome (or a designated outcome) in at least one secondary game;

(26) any player (or a designated player) engaging an input device of one of the gaming devices to make a selection in one or more games;

(27) an amount of credits or free spins provided for one or more games;

(28) a total amount of credits won or lost over an amount of time elapsed;

(29) an amount of time elapsed;

(30) any event disclosed herein which is tracked for a group of the gaming devices;

(31) any event disclosed herein which includes a group of the gaming devices working together for each occurrence of such tracked event;

(32) any event disclosed herein which is tracked for a group of the players;

(33) any event disclosed herein which includes a group of the players working together for each occurrence of such tracked event; and/or

(34) any suitable event which occurs in association with a player's gaming experience.

In different embodiments, which designated event or condition is tracked by the central controller is predetermined, randomly determined, determined based on the player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day), determined by the game operator or gaming establishment or determined based on any other suitable method or criteria.

In one embodiment, the central server monitors or tracks each of the plays of the game at each one of the gaming devices to determine whether the designated event has occurred (or whether the designated condition has been satisfied), as indicated by block 106 of FIG. 3. If the designated event occurs or has occurred, the central controller resets an event counter associated with the non-occurrence of the designated event, as indicted by block 108. That is, the central controller resets the event counter to a reset value because the designated event occurred. In one embodiment, the reset value is an initial value of the event counter. In another embodiment, the reset value is randomly determined from a range of values. In one embodiment, the reset value is any suitable value.

If the designated event has occurred, the central controller causes an award to be provided to one or more player for the occurrence of the designated event, as indicated by block 110. In different embodiments, the central controller resets the event counter before, substantially at a same time as, or after causing the award to be provided to one of the players. If the designated event has not occurred, the central controller increments the event counter, as indicted by block 112. That is, the event counter increments because the designated event did not occur.

In one embodiment, the event counter starts at an initial value and increments through one or more incremented values toward a predetermined value. For example, the event counter starts at an initial value, such as zero, and increments by an incremented value of one toward a predetermined value, such as one-hundred. In this example, the event counter increments by one for each play of the game in which the designated event does not occur. In another embodiment, the event counter decrements from the initial value by a decremented value toward a predetermined value. For example, the event counter starts at an initial value of one-hundred and decrements by a decremented value of one toward a predetermined value of zero. In this example, the event counter decrements by one for each play of the game in which the designated event does not occur. It should be appreciated that the incremented value, the decremented value, or the predetermined value could be any suitable value. It should also be appreciated that the incremented value, the decremented value, or the predetermined value could be determined based on the player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day), determined by the game operator or gaming establishment or determined based on any other suitable method or criteria.

In one embodiment, the event counter increments or decrements by one for each play of the game in which the designated event does not occur and a player of the game places a minimum wager. In one such embodiment, if the player does not place the minimum wager, the event counter does not increment or decrement toward the predetermined value. That is, the player who did not place the minimum wager does not qualify to play for the award associated with the non-occurrence of the designated event. In another embodiment, a player of the game qualifies to play for the award associated with the non-occurrence of the designated event by placing a wager on a minimum number of paylines. It should be appreciated that the central controller may apply any suitable qualifying condition for the players.

In one embodiment, a plurality of different players qualify to play for the award associated with the non-occurrence of the designated event by satisfying different qualifying conditions. In one such embodiment, the qualifying condition is based on the player's status (such as determined through a player tracking system) or any other suitable condition or event. For example, a first player status (e.g., platinum) qualifies to play for the award associated with the non-occurrence of the designated event by satisfying a first wager amount or level (e.g., 3 credits) and a second player status (e.g., gold) qualifies to play for the award associated with the non-occurrence of the designated event by satisfying a second, different wager amount or level (e.g., 4 credits).

In one embodiment, the event counter increments or decrements based on time. In one such embodiment, the event counter increments or decrements by one time interval for an amount of time since the last designated event occurred. In one embodiment, the event counter increments or decrements based on an amount of coin-in for each individual player. In another embodiment, the event counter increments or decrements based on an amount of coin-in for the players at the gaming devices in the group collectively.

After incrementing (or decrementing) the event counter, the central controller determines whether the incremented value of the event counter at least equals a designated quantity or threshold as indicated by block 114. In one embodiment, the designated quantity or threshold includes a quantity of games. That is, the event counter counts the quantity of games played since the last designated event occurred.

If the incremented value of the event counter does not at least equal the designated quantity or threshold, the central controller continues to monitor or track each of the plays of the game to determine if the designated event has occurred, as described above and indicated by block 104. If the incremented value of the event counter at least equals the designated quantity or threshold, the central controller provides one or more of the players an award for the non-occurrence of the designated event, as indicated by block 116. By reaching the designated quantity or threshold, the event counter has counted a predetermined quantity of games played (or a predetermined amount of time) since the last designated event has occurred.

In one such embodiment, the designated event occurs when the gaming devices in the gaming system provide awards to the players having an accumulated value at least equal to a threshold value. In this example, the gaming system tracks the amount of credits provided by the players of the gaming devices (e.g., coin-out). If the accumulated value of the awards provided to the players is greater than or equal to the threshold value in a predetermined time period or a predetermined number of games, the central server determines that the designated event has occurred. In this embodiment, the gaming establishment guarantees to pay out the threshold value in the predetermined time period or predetermined number of games. If the gaming system pays out the predetermined amount before the event counter reaches the predetermined number of games (i.e., the designated event occurs), the gaming system resets the event counter. If the gaming system does not pay out the predetermined amount before the event counter reaches the predetermined number of games (i.e., the designated event does not occur), the gaming system provides a designated award, such as $20,000 or 20,000 credits, to at least one of the players for the non-occurrence of the designated event.

It should be appreciated that the award for the non-occurrence of the designated event (as indicated by block 116) and the award for the occurrence of the designated event (as indicated by block 110) could be the same type of award, different types of awards, or related awards. For example, the award for the non-occurrence of the designated event is a first value, such as 2000 credits, and the award for the occurrence of the designated event is a second, different value, such as 1000 credits.

In one embodiment, the award associated with a non-occurrence of the designated event is a progressive award. In one such embodiment, the central controller provides one or more players the progressive award if the designated event does not occur (e.g., a win of at least a designated value) within a predetermined quantity of games or within a designated time. It should be appreciated that the gaming system and method disclosed herein provide players an opportunity to win relatively high awards while the progressive award associated with the non-occurrence of a designated event grows to large values. That is, as players win relatively large awards, the event counter resets. The progressive award is not provided when the event counter resets. Thus, if players win relatively large awards, the event counter frequently resets and the progressive award grows to large values. Accordingly, player excitement increases because the players are winning relatively large awards simultaneously with the progressive award growing to large values. If the event counter reaches the designated quantity (as described above and indicated by block 114), the central controller provides the progressive award to one or more players.

In one embodiment, the central controller provides the award associated with the non-occurrence of the designated event to one player. For example, the player who caused the event counter to increment to the designated quantity would be provided the award. In another embodiment, the central controller divides the award associated with the non-occurrence of the designated event between a plurality of players. In different embodiments, the central controller determines to provide a portion of the award to two or more players based on: (i) a wager or coin-in associated with each of the players, (ii), an amount of coin-out associated with each of the players, (iii) a rate of play associated with each of the players, (iv) a player status (as determined by a suitable player tracking system), (v) an event counter, if any, associated with each player or stored on a player tracking card associated with each player, (vi) a point or ranking system, (vii) any suitable factor or method of dividing an award amongst a plurality of players, or (viii) any combination of the above.

In one embodiment, the central controller determines to provide a portion of the award to two or more players based on a point or ranking system. In one such embodiment, the central controller determines whether to provide a quantity of points to one of the players playing at the gaming devices in the gaming system. In one embodiment, the determination of whether to provide a quantity of points to one of the players is based on an event or condition which is independent from the plays of the games at each of the gaming devices. For example, the determination is independent from any event displayed by the gaming devices.

In one embodiment, the determination whether to provide a quantity of points to one of the players is based on an outcome of at least one play of each of the games at the gaming devices. In one embodiment, a first quantity of points is associated with a first outcome of the at least one play of each of the games and a second, different quantity of points is associated with a second, different outcome of the at least one play of each of the games. In one such embodiment, the second, different quantity of points is greater than the first quantity of points and the first outcome is associated with a first award value which is greater than a second award value associated with the second, different outcome. For this embodiment, outcomes that are associated with higher award values are also associated with lower quantities of points. Table 1 below illustrates an example of the relationship between the outcome, award value and quantity of points which could be implemented by the disclosed gaming system.

TABLE 1

| OUTCOME | AWARD | POINTS |
|---|---|---|
| 1st outcome | 0 | 20 |
| 2nd outcome | 50 | 10 |
| 3rd outcome | 250 | 3 |

In one example embodiment, Table 2 below illustrates an example relationship between the outcome for a poker game, the award value and the quantity of points which could be implemented by the disclosed gaming system.

TABLE 2

| Outcome | Award | Points |
|---|---|---|
| Royal flush | 800 | 0 |
| Straight flush | 50 | 0 |
| Four of a kind | 25 | 1 |
| Full house | 9 | 2 |
| Flush | 6 | 3 |
| Straight | 4 | 5 |
| Three of a kind | 3 | 7 |
| Two pair | 2 | 10 |
| Pair of Jacks or better | 1 | 15 |
| Other (any hand lower than a pair of Jacks) | 0 | 20 |

In one embodiment, the award of Table 2 is applied to each credit wagered by a player. For example, if the player wagered two credits and obtained two pair, the award provided to the player is four credits (e.g., the amount of credits associated with two pair multiplied by the amount of credits wagered). In one embodiment, the quantity of points of Table 2 are applied to each credit wagered by a player. For example, if the player wagered five credits and obtained a pair of queens, the player would accumulate seventy-five points (e.g., the amount of points associated with a pair of jacks or better multiplied by the amount of credits wagered).

It should be appreciated that, in one embodiment, the award and/or the amount of points may increase by different amounts as more credits are wagered by the player. For example, if the player wagers one credit, the outcome of two pair is associated with two credits and fifteen points and if the player wagers two credits, the outcome of two pair is associated with five credits and thirty-five points. In another example, if the player wagers one credit, the outcome of two pair is associated with two credits and fifteen points and if the player wagers two credits, the outcome of two pair is associated with either: (i) five credits and thirty points or (ii) four credits and thirty-five points.

In one embodiment, a plurality of outcome levels or tiers are provided which each include one or more outcomes. Each outcome level or tier includes one or more outcomes associated with an award. In one embodiment, each outcome of each outcome level or tier is associated with an award having substantially the same value. The outcome or outcomes of each outcome level or tier may be associated with any suitable award, such as progressive awards, free spins, free games, multipliers or other modifiers, a predetermined quantity of credits, a triggering event to a bonus game, or any combination of such awards.

It should be appreciated that the outcome, award and points can be set by the gaming system operator to be any suitable value. In one embodiment, the inverse relationship between the quantity of points and the award value for each outcome is preserved, as illustrated by the above table. That is, the quantity of points associated with each outcome decreases as the award value associated with that outcome increases.

In another embodiment, the quantity of points associated with each outcome increases as the award value associated with that outcome increases. Table 3 illustrates an example relationship between the outcome for a poker game, the award value and the quantity of points which could be implemented by the disclosed gaming system.

TABLE 3

| Outcome | Award | Points |
|---|---|---|
| Royal flush | 800 | 50 |
| Straight flush | 50 | 20 |
| Four of a kind | 25 | 15 |
| Full house | 9 | 10 |
| Flush | 6 | 7 |
| Straight | 4 | 5 |
| Three of a kind | 3 | 3 |
| Two pair | 2 | 2 |
| Pair of Jacks or better | 1 | 1 |
| Other (any hand lower than a pair of Jacks) | 0 | 0 |

In one embodiment, the outcomes of different games, such as different types of games, being played at the gaming devices are associated with the same award values and the same quantities of points. In one embodiment, a first outcome of a first game and a first outcome of a second game are each associated with the same award. In one embodiment, as illustrated below in Table 4, outcomes A, B and C of the first game are respectively associated with the same award value and the same quantity of points as outcomes D, E and F of the second game.

TABLE 4

| OUTCOME OF 1st GAME | OUTCOME OF 2nd GAME | AWARD | POINTS |
|---|---|---|---|
| A | D | 0 | 20 |
| B | E | 50 | 10 |
| C | F | 250 | 3 |

In another embodiment, the outcomes of different games, such as different types of games, being played at the gaming devices are associated with different award values and/or different quantities of points. In one embodiment, as illustrated in Table 5, a first outcome of a first game is associated with a different award and/or a different quantity of points as a first outcome of a second game. For example, a first outcome (e.g., A) of a first game (e.g., a reel game) is associated with a different award and/or a different quantity of points as a first outcome (e.g., X) of a second, different game (e.g., a poker game). By associating a quantity of points with different game outcomes and/or the outcomes of different types of games, the gaming system enables more players to participate in the point or ranking system.

TABLE 5

| OUT-COME OF 1$^{st}$ GAME | AWARD | POINTS | OUTCOME OF 2nd GAME | AWARD | POINTS |
|---|---|---|---|---|---|
| A | 0 | 20 | X | 10 | 15 |
| B | 50 | 10 | Y | 25 | 10 |
| C | 250 | 3 | Z | 100 | 5 |

In one embodiment, the central controller determines the quantity of points accumulated for one or more of the players based on the player status of each of the players. In one embodiment, a plurality of different player statuses are associated with different quantities of points. It should be appreciated that higher player statuses can be associated with greater quantities of points and lower player statuses can be associated with lesser quantities of points. For example, a first player status (e.g., gold) is associated with a first quantity of points (e.g., 20) when one of the outcomes (e.g., A) is generated and a second player status (e.g., silver) is associated with a second, different quantity of points (e.g., 15) when the same one of the outcomes (e.g., A) is generated. In one embodiment, the different player statuses are associated with different award values and/or different quantities of points for one or more outcomes of a game.

In one embodiment, the central controller determines the quantity of points, if any, to accumulate for at least one of the players. The central controller accumulates a total quantity of points for the players. In one embodiment, the gaming system accumulates a quantity of points for each player based on one or more point accumulation events. In one embodiment, a point accumulation event occurs in association with the plays of the games played at each of the gaming devices. In another embodiment, a point accumulation event occurs independent from the plays of the games played at each of the gaming devices. In different embodiments, a point accumulation event includes, but is not limited to:

(1) a deposit of an amount of funds at the gaming device;

(2) an identification of a player (or a designated player) at the gaming device;

(3) a generation of any outcome (or a designated outcome);

(3) a generation of any outcome (or a designated outcome) associated with an award;

(4) a generation of any outcome (or a designated outcome) associated with an award over a designated value;

(5) a generation of an outcome (or a designated outcome) on a designated payline;

(6) a generation of an outcome (or a designated outcome) in a scatter configuration;

(7) a generation of a winning way to win (or a designated winning way to win);

(8) a generation of a designated symbol or symbol combination;

(9) a generation of a designated symbol or symbol combination on a designated payline;

(10) a generation of a designated symbol or symbol combination in a scatter configuration;

(11) an eligible gaming device providing any player (or a designated player) an award amount;

(12) a triggering of a play of a secondary game;

(13) an activation of a secondary display (such as an award generator);

(14) an activation of a community award generator;

(15) a generation of any outcome (or a designated outcome) in a secondary game;

(16) any player (or a designated player) engaging an input device of the gaming device to make a selection in a game;

(17) an amount of credits or free spins provided;

(18) a total amount of credits won or lost over an amount of time elapsed;

(19) an amount of time elapsed;

(20) any event disclosed herein which is tracked for a group of gaming devices;

(21) any event disclosed herein which includes a group of gaming devices working together for each occurrence of such tracked event;

(22) any event disclosed herein which is tracked for a group of players;

(23) any event disclosed herein which includes a group of players working together for each occurrence of such tracked event;

(24) any suitable event which occurs in association with a player's gaming experience; and/or

(25) any suitable event which occurs independent from a player's gaming experience.

In one embodiment, at least one point accumulation event occurs in association with one of the games played. In one such embodiment, a first point accumulation event occurs in association with one of the outcomes of the games played. If the outcome associated with the first point accumulation event is generated, the gaming system provides a first award value, such as $0, and accumulates a first quantity of points, such as twenty points, for the player at the gaming device which generated the outcome associated with the first point accumulation event. In one embodiment, different outcomes of a game are different point accumulation events and associated with different award values and/or different quantities of points. In one such embodiment, a second point accumulation event is associated with one outcome of the games played, and a third point accumulation event is associated with another one of the outcomes of the games played. For example, if a second, different point accumulation event occurs in association with one of the games played, the gaming system provides a second award value, such as $50, and accumulates a second, different quantity of points, such as ten points, for the player at the gaming device which generated the outcome associated with the second point accumulation event. If a third, different point accumulation event occurs in association with one of the games played, the gaming system provides a third award value, such as $500, and accumulates a third, different quantity of points, such as zero points, for the player at the gaming device which generated the outcome associated with the third point accumulation event. In one such embodiment, the gaming system accounts for: (i) each one of the games played in which the designated event occurs or does not occur, and (ii) a quantity of points accumulated by each player for the games played at each of the gaming devices. In one such embodiment, the gaming system increments an event counter to account for each of the games played which do not result in the designated event and increments a point meter to account for the quantity of points accumulated by each of the players.

In one embodiment, the central controller accumulates points for each player individually and stores such points in association with the player's account or the player's player tracking card (which is associated with a suitable player tracking system.) In one such embodiment, a player can accumulate points at different gaming devices or by playing different games while continuing to compete for the designated award. For example, the player can leave one gaming device to play another gaming device and remain eligible to win the designated award.

In one embodiment, the central controller accumulates points for each player individually and stores such points in association with a team which includes a plurality of players. In one such embodiment, the central controller associates one or more players with at least one team and associates any points accumulated by such players with the at least one team. In this embodiment, teams of players compete for the designated award instead of individual players competing for the designated award. In one such embodiment, one or more players of the team may split or divide the designated award based on the amount of points accumulated individually or based on any other suitable determination. For example, team 1 including Player A and Player B and team 2 including Player C and Player D compete for the designated award by accumulating points as described above. If team 1 wins the designated award, the players A and B may split the designated award equally or proportionately relative to the amount of points contributed to the total amount of points for the team.

In another embodiment, the central controller accumulates points for each player individually and stores such points in association with the gaming device being played by the player. In this embodiment, any points accumulated by a first player at a first gaming device are stored by the central controller in association with that first gaming device so that if the first player leaves the first gaming device, the accumulated points remain associated with that first gaming device for subsequent players.

In one embodiment, the central controller determines a score or ranking for each one of the players based on any points each of the players accumulated. That is, the central controller converts any points accumulated by the players into a score or ranking for each player. In one embodiment, the central controller provides an award (or a portion of the award) to one or more players based on the determined score or ranking for each of the players. In another embodiment, the central controller provides an award (or a portion of the award) to one or more players based on the quantity of points accumulated by each of the players.

As described above, in one embodiment, the central controller determines whether a designated event occurs in association with a predetermined quantity of the plays of the games. If the central controller determines that the designated event did not occur, the central controller provides a first award for the non-occurrence of the designated event based on a total quantity of points, if any, provided to each of the players. If the central controller determines that the designated event has occurred, the central controller provides a second, different award for an occurrence of the designated event. In one embodiment, the second, different award for an occurrence of the designated event is provided to whichever player or gaming machine causes the occurrence of the designated event. In one such embodiment, the second, different award for an occurrence of the designated event is not based on a total quantity of points, if any, provided to each of the players.

In one embodiment, the central controller resets the quantity of points accumulated by the player after the designated event occurs or after the designated award threshold is met. In other embodiments, the central controller enables the player (and/or other players playing at gaming devices in the gaming system) to keep all or some of the points accumulated in previous plays of the game when the designated event occurs or the designated award threshold is met. In one embodiment, the determination for one or more of the players to keep one or more points is predetermined, randomly determined, determined based on the player's status (such as determined through a player tracking system), the active or inactive status of the player (as described below), determined based on a generated symbol or symbol combination, determined based on a random determination by the central controller, determined based on a random determination at the gaming device, determined based on one or more side wagers placed, determined based on one or more primary game wagers placed, determined based on time (such as the time of day), determined by the game operator or gaming establishment or determined based on any other suitable method or criteria.

In one embodiment, the central controller determines a probability to win the designated award based on the total number of points accumulated by each player. In another embodiment, the central controller determines a relative portion of the designated award won by one or more of the players based on the quantity of points accumulated by each of the players. In one embodiment, the player who has accumulated the most points is provided with the entire designated award. In other embodiments, as described above, the central controller provides relative portions of the designated award to a plurality of players based on the quantity of points accumulated by each of the players relative to a total quantity of points accumulated by all of the players.

In different embodiments, the central controller provides the designated award to one or more players based on:

(1) a quantity of points accumulated;

(2) a wager of a designated amount (e.g., a minimum wager or a maximum wager);

(3) an identification of each player (or a designated player) at the gaming device;

(3) an individual status, such as active or inactive, of each player (as determined by the central controller);

(4) a player status or ranking (as determined by a suitable player tracking system); and/or (5) an event counter associated with the designated award.

If the central controller determines that the designated award will be provided, the central controller also determines which player(s) of the system gaming machine(s) will be eligible for all or part of the designated award. Such a determination is based in part on the individual status of each of the players in the gaming system. That is, the individual status of each player determines whether that player is eligible to be selected to be provided all or part of the designated award. In one embodiment, each player is determined to have either an active status or an inactive status. Active status means that the player is actively playing at one of the system gaming devices (i.e., an active player). The active status requirements can be based on any suitable number of satisfied criteria or defined in any suitable manner by the implementer of the gaming system disclosed herein. For instance, a play of or wager on the primary game of one of the gaming devices within a predetermined period of time may be part of the determination of whether that player playing at the gaming device is in the active status (i.e., actively playing at that gaming device). In one instance, the active status requirement is based on the player playing at one of the system gaming devices and earning a designated amount of points during a qualification period. Other factors such as: (a) the amount of time between each play of or wager on the primary game by the player; (b) the amount being wagered on the primary game(s) by the player; (c) the amount being won or lost on the primary game(s) within a period of time by the player, (d) the number of plays within a period of time by the player, (e) the existence of any points accumulated by the player, and (f) the existence of credits for the player on a gaming device may also or alternatively be part of the determination of whether a player is in the active status. On the other hand, the inactive status means that the player is not actively playing at one of the system gaming devices (i.e., an inactive player). That is, a player in the inactive status is not actively playing at one of the system gaming devices according to one or more of the predetermined criteria during the qualification period.

In one embodiment, any active players are qualified to win all or part of the designated award while any inactive players are not qualified to win all or part of the designated award. In one embodiment, any active players or any inactive players are qualified to win all or part of the designated award. For example, if an active player leaves one of the system gaming devices for a period of time and that player's status changes from active status to inactive status, that player may still be qualified to win all or part of the designated award. In one instance, any points accumulated by the player remain active for ranking or award determination purposes. In one embodiment, an inactive player may qualify to win all or part of the designated award, but such award is provided to the player if that player changes to the active status within a designated period of time. In one such embodiment, if the designated period of time elapses without the inactive player becoming active, the portion of the designated award that the inactive player would have won is added to a subsequent designated award.

Referring now to FIGS. 4A to 4D, the central controller is configured to provide a quantity of points based on the outcome of each game played by the player at each of the gaming devices. FIGS. 4A to 4D illustrate a timeline 120 of a plurality of events 126, 128, 130, 132, 134, 136, 138 and 140 which can occur in accordance with one embodiment of the disclosed gaming system. In one embodiment, the gaming system communicates information or messages regarding one or more of the events 126, 128, 130, 132, 134, 136, 138 and 140 to the players at each of the gaming devices. In the embodiment illustrated in FIGS. 4A to 4D, such information or messages are displayed via respective community displays 142, 144, 146, 148, 150, 152, 154 and 156 to the players playing at each of the participating gaming devices in the gaming system.

In the embodiment illustrated in FIGS. 4A to 4D, the designated event or threshold 122 is a win or an award of at least a designated amount, such as 1000 credits. As described above, the designated event can be different events or conditions based on the embodiment of the gaming system. The designated award 124 is associated with the non-occurrence of the designated event 122. That is, if the designated event 122 does not occur within a predetermined number of games (or within an amount of time) since the last designated event occurred, the central controller provides the designated award 124 to one or more players. In the embodiment illustrated in FIGS. 4A to 4D, the designated award 124 has a value of 2000 credits and is provided if the designated event 122 does not occur within one-hundred games. That is, if event counter increments from zero to one-hundred, the central controller will provide the designated award 124 to one of the players.

In the embodiment illustrated in FIGS. 4A to 4D, if the designated event does not occur within one-hundred games, the central controller provides the designated award, such as 2000 credits. If the designated event occurs within one-hundred games, the central controller provides a second, different award associated with the designated event, such as 1000 credits, to at least one of the players. It should be appreciated that the gaming system disclosed herein provides players with an opportunity to win relatively high awards (e.g., 1000 credits) with each non-occurrence of the designated event. That is, as players win relatively large awards (e.g., 1000 credits), the event counter resets. The designated award (e.g., 2000 credits) is not provided when the event counter resets. Thus, if players win relatively large awards, the event counter resets and the designated award is not provided. Player excitement increases because the players are winning relatively large awards (e.g., 1000 credits) while continuing pursuit of the designated award (e.g., 2000 credits).

Figure 4A:
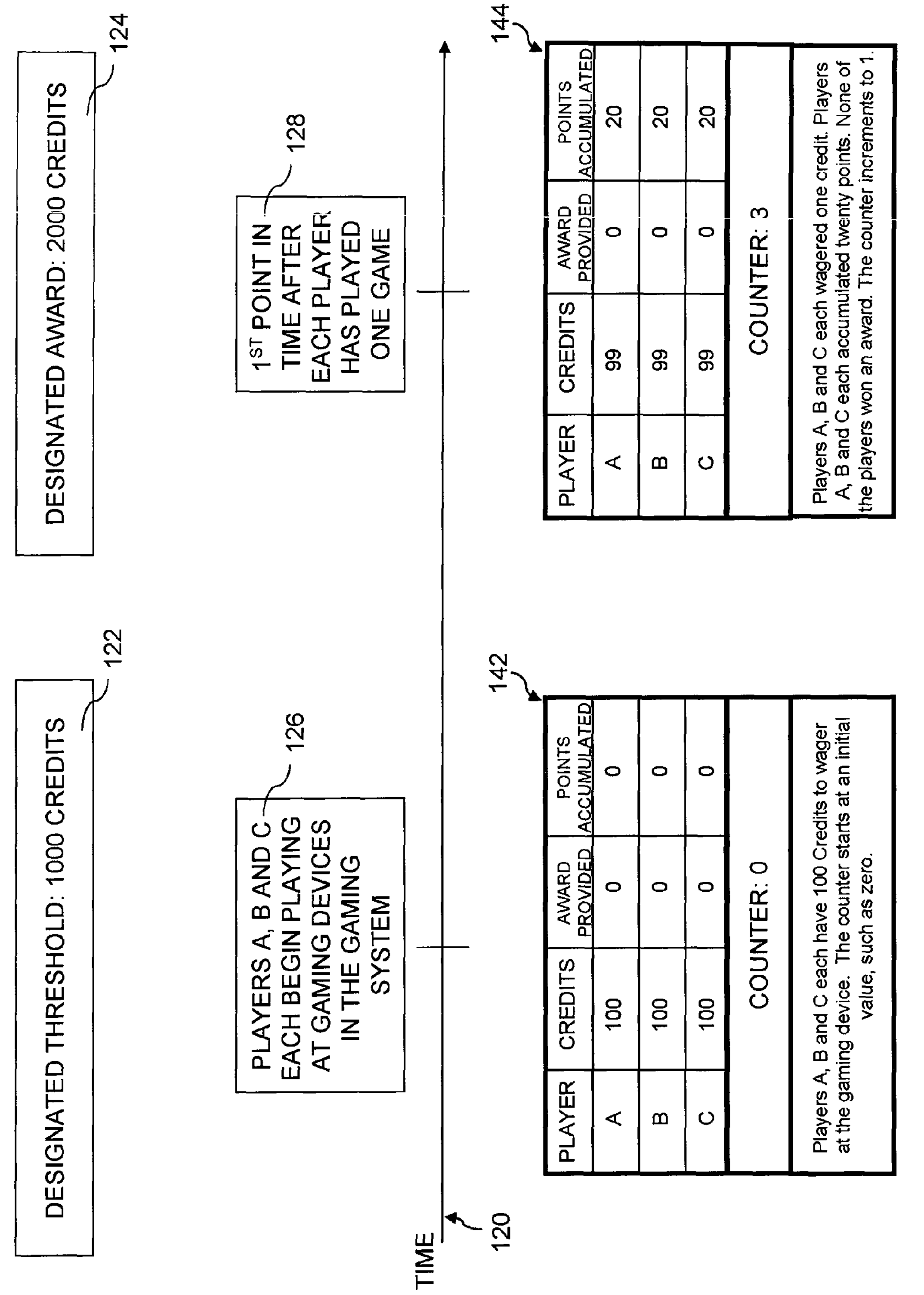

Event 126 represents a point in time at which players A, B and C begin playing at least one game at gaming devices in the gaming system. Timeline 120 illustrates different points in time that players A, B and C play at the gaming devices. At this point in time, the community display 142 of FIG. 4A displays that players A, B and C each have 100 credits and have not accumulated any awards or points prior to event 126. It should be appreciated that players A, B and C can start with any suitable number of credits or points and often one or more of the players will start a play of a game with different number of credits and/or different number of points. As illustrated in FIG. 4A, event counter begins at zero.

Event 128 represents a first point in time after each of the players A, B and C have played one play of the at least one game. Players A, B and C each wagered one credit for the play of the at least one game. At this point in time, the community display 144 of FIG. 4A displays that the outcome of the first play is associated with 0 credits for each of the players A, B and C. The central controller provides each of the players with 20 points. Because neither Player A, B nor C won an award at least equaling 1000 credits, the event counter increments to three. In one embodiment, the event counter increments by one for each game or play of the game played by each player regardless of whether such games or plays are played synchronously or asynchronously.

Figure 5A:
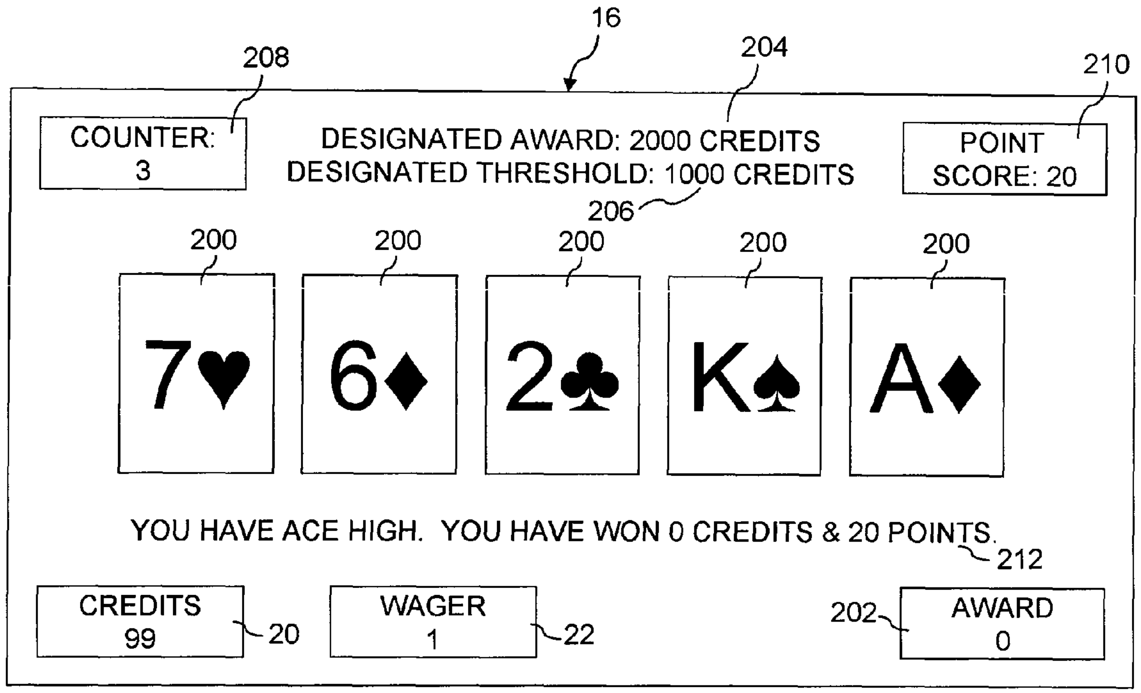
FIGS. 5A, 5B, 5C, and 5D are enlarged front plan views of a display device of a gaming device disclosed herein, illustrating an example of one embodiment of the present disclosure where certain events occur in association with a game.

In one embodiment, the event 128 is displayed by the gaming device being played by one of the players A, B or C. Referring now to FIG. 5A, the display device 16 illustrates an example of a game play screen for one embodiment of the gaming system described herein. For ease of illustration, the relevant game information is shown on the display device 16. In alternative embodiments, the relevant game information is divided between different areas of the display device 16 or divided between the display devices 16 and 18. Alternatively, the display device 18 is configured to display the example of the game play screen.

It should be appreciated that display device 16 represents a game play screen as viewed by one player at one gaming device in the gaming system. The following game play screens are configured to be displayed by each gaming device in the gaming system, with the outcomes of each gaming device being independently controlled by the central controller and/or the gaming device processor.

In FIG. 5A, the display device 16 displays a plurality of playing cards 200 dealt from a deck of playing cards for a game. The playing cards 200 each have a suit and value combination. The dealt playing cards form a poker hand, which the central controller and/or the gaming device processor evaluates to determine an outcome for the game. If the outcome is a winning outcome, the central controller and/or the gaming device processor causes an award associated with the winning outcome to be provided or indicated to a player. In different embodiments, a plurality of reels, symbols, characters, numbers, or any other suitable objects as determined by the game implementer are used instead of cards 200 to form the outcome for the game. In different embodiments, the central controller enables the player to hold or replace any number of the dealt cards 200 for a number of draws (e.g., one, two or more) to form the outcome for the game.

The display device 16 also displays a credit display 20 which displays a player's current number of credits, cash, account balance, or the equivalent. The credit display 20 indicates to the player how many credits or other type(s) of currency are available for play of the game. The display device 16 also displays a wager display 22 which displays a player's amount wagered for each play of the game. The player's amount wagered is a number of the credits and is subtracted from the credit display 20 for each play of the game. As illustrated in FIG. 5A, the credit display 20 indicates that the player, such as Player A, has 100 credits. The wager display indicates that Player A wagered 1 credit on this play of the game.

The display device 16 also displays an award display 202. The award display 202 indicates to the player how many credits or other type(s) of award are provided in the play of the game. During an award attempt, any award received by a player is added to the award indicated by the award display 202. Once the play of the game ends, the award amount indicated by the award display 202 is provided to the player. The award amount is added to the player's credit total indicated by the credit display 20. As illustrated in FIG. 5A, the award display 202 indicates that the award for the player, such as Player A, is zero because, for this example, an ace high outcome is not associated with an award.

The display device displays a designated award display 204 and a designated event or threshold display 206. As illustrated in FIG. 5A, the designated award display 204 indicates the designated award 124 such as 2000 credits. In one embodiment, the designated award is a progressive award which increments from an initial value to an incremented value. The designated event or threshold display 206 indicates a designated threshold of a predetermined amount of credits 122, such as one thousand credits. In this embodiment, the central controller provides the designated award 124 indicated by the designated award display 204 if the designated threshold indicated by the designated event or threshold display 206 is not met in a predetermined number of games or plays of the game (e.g., one-hundred games or plays of the game).

In one embodiment, the designated event or threshold display 206 indicates a designated event of a predetermined combination of the cards 200 (e.g., a four of a kind) instead of a designated threshold (e.g., one thousand credits). It should be appreciated that outcomes having a ranking of four of a kind or better would satisfy the designated award threshold. Thus, a designated event or a designated award threshold can convey substantially similar information to the player. It should also be appreciated that the designated event or threshold display 206 is configured to display either or both of the designated event or award threshold. In one embodiment, the central controller requests an input from the player and causes the display device 16 to display either or both of the designated event or award threshold based on the player input.

The display device 16 displays an event counter display 208, which indicates each non-occurrence of the designated event or threshold. That is, for each game or play of the game which does not result in the designated event occurring or the designated threshold being met, the event counter display 208 increments toward the predetermined number of games or plays of the game. If the event counter display 208 increments to the predetermined number of games or plays of the game, the central controller provides the designated award indicated by the designated award display 204. For each game or play of the game which results in the designated event occurring or the designated threshold being met, the event counter display 208 resets to an initial value. As illustrated in FIG. 5A, the event counter display 208 is at three which indicates that the designated threshold or event 122 has not occurred in the last three games or plays of the game. In this embodiment, the predetermined number of games or plays of the game is equal to one hundred. In one embodiment, the predetermined number of games or plays of the game (e.g., one hundred) is displayed on the display device 16.

In one embodiment, the event counter display 208 decrements from the predetermined number of games or plays of the game to zero. In one such embodiment, if the event counter display 208 decrements to zero from the predetermined number of games or plays of the game, the central controller provides the designated award indicated by the designated award display 204 to one of the players playing at the gaming devices in the gaming system.

The display device 16 displays a point or score display 210. The point or score display 210 displays the total number of points accumulated by the player for one or more plays of the game. In one embodiment, as described above, one or more outcomes of the game are associated with a quantity of points in addition to, or in replacement of, an award. As the player accumulates points in association with the game, the point display 210 updates to display the current point total or score for the player. Display device 16 represents one game screen as viewed by one player of a plurality of players playing at a plurality of gaming devices in the gaming system. In one embodiment, the point or score display 210 displays a score or ranking relative to any other players participating in the award attempt or game.

As illustrated in FIG. 5A, the point display 210 indicates that the player, such as Player A, has accumulated twenty points. On the illustrated play of the game, the player has won twenty points for achieving an ace high combination indicated by the cards 200. The point display 210 displays the current point total or score for the player, such as twenty points. In other embodiments, the ace high combination and other combinations described below may be associated with more or less points as determined by the gaming system implementer.

In one embodiment, the display device 16 displays a message or instruction area 212 which can display messages or instructions to the player, such as Player A. The central controller is programmed to control which messages or instructions are displayed by the message area 212. Appropriate messages or instructions such as "YOU HAVE ACE HIGH" or "YOU HAVE WON 0 CREDITS & 20 POINTS" may be provided to the player visually, or through suitable audio or audiovisual displays.

Figure 4B:
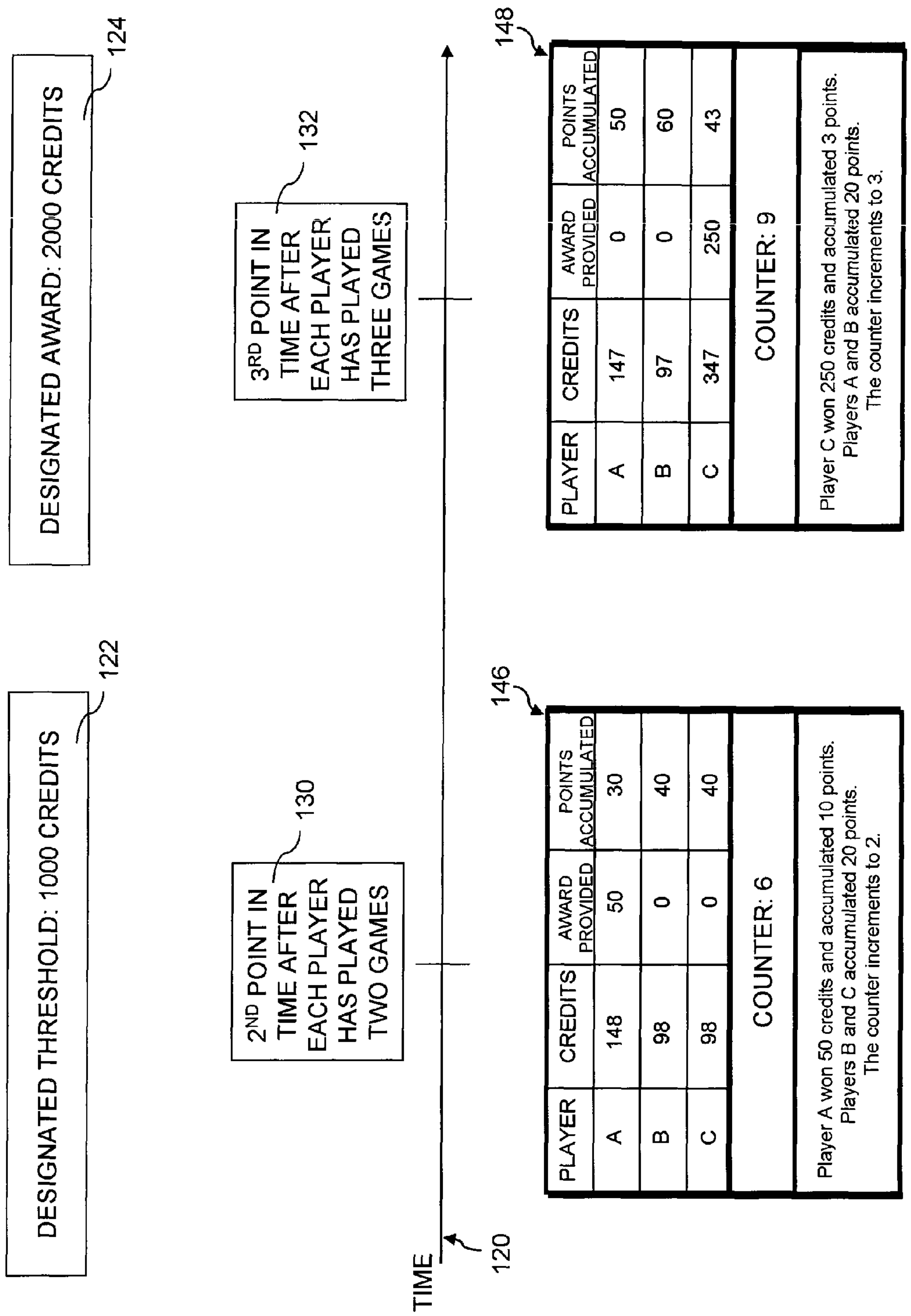

Timeline 120 continues as illustrated in FIG. 4B. Event 130 represents a second point in time after players A, B and C have each played two games. Players A, B and C each wagered one credit for the play of the at least one game. At this point in time, the community display 146 of FIG. 4B displays that Player A won an award of fifty credits and players B and C won awards of zero credits. The central controller accumulates 10 points for Player A and provides Player A with the award of fifty credits. At this point in time, Player A has 148 credits and has accumulated 30 points. Since neither Player B nor Player C won an award, the central controller accumulates 20 points for players B and C. At this point in time, players B and C each have 98 credits and have each accumulated 40 points. Because neither Player A, B nor C won an award at least equaling 1000 credits, the event counter increments to two.

Figure 5B:
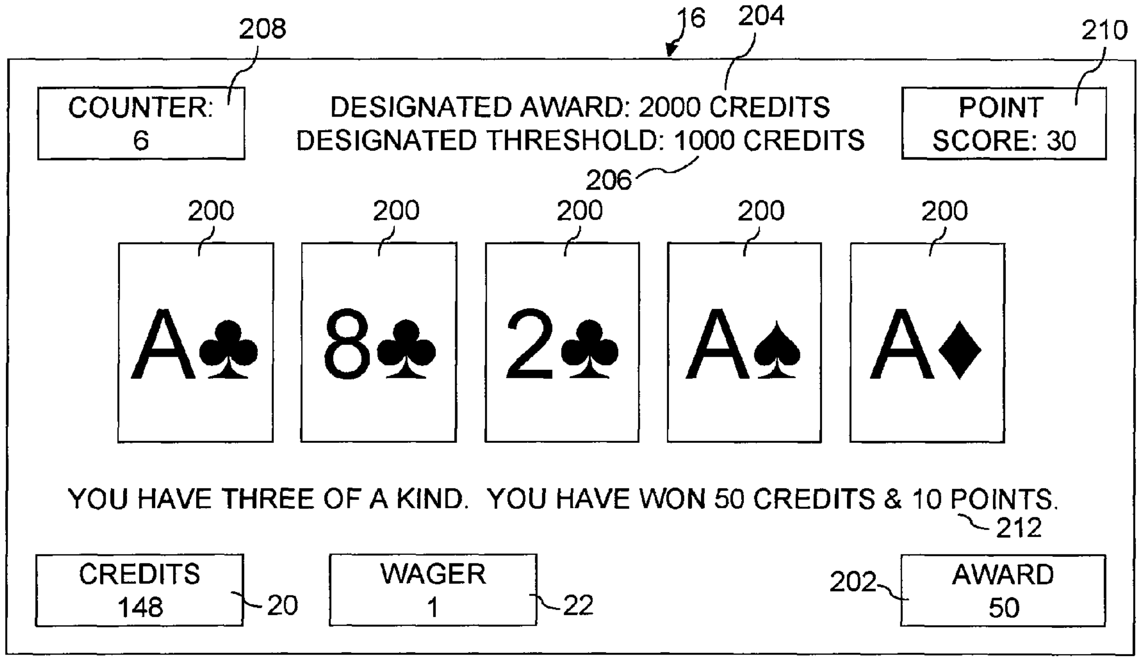

Referring now to FIG. 5B, the display device 16 illustrates an example of a game play screen for Player A according to one embodiment of the gaming system. In the illustrated play of the game, the credit display 20 indicates that Player A has one-hundred forty-eight credits or other type(s) of currency available for play of the game. The wager display 22 indicates that Player A wagered one credit for the illustrated play of the game. The poker hand formed by dealt cards 200 resulted in a combination of a three of a kind aces. In this embodiment, a poker hand resulting in a three of a kind is associated with a multiplier applied to the player's wager in addition to ten points. In the illustrated play of the game, Player A wagered one credit and won fifty credits and ten points for achieving a three of a kind.

In one embodiment, the quantity of points associated with a designated outcome or combination of symbols of cards 200 is based on the player's wager. For example, in one such embodiment, the central controller would provide the player with a number of points, such as ten points, for each credit wagered by the player for each play of the game which results in a designated outcome, such as an outcome of a three of a kind. In the illustrated play of the game, Player A wagered one credit and won ten points. In another example, if Player A had wagered two credits, Player A would have won twenty points (e.g., ten points for a three of kind×two credits wagered) instead of ten points.

In the play of the game illustrated in FIG. 5B, the central controller determines that the designated award threshold was not met because the player won fifty credits. In another embodiment, if the designated event is an outcome at least equaling a four of a kind, the central controller determines that the designated event did not occur because the player achieved an outcome of three of a kind. As a result, the event counter display 208 increments to six. The event counter display 208 progressed toward the predetermined number of games or plays of the game (e.g., one-hundred games or plays of the game). It should be appreciated that the counter increased to six from three in FIGS. 5A and 5B which indicates that players A, B and C have played six games collectively. As described above, the event counter may count the number of games or plays of the game for the players synchronously or asynchronously. In one embodiment, players A, B and C each play a game and the event counter counts this as one game or play. In another embodiment, players A, B and C each play the game at different rates or times and the event counter individually counts each game or play regardless of: (i) when that game or play was played, and (ii) which player played the game or play.

The point or score display 210 displays thirty points, which represents the total number of points accumulated by Player A for previous plays of the game. The award display 202 indicates the amount of credits won by the player, which is fifty in the illustrated play of the game. The display device 16 displays an appropriate message or instruction in message or instruction area 212, such as "YOU HAVE THREE OF A KIND" or "YOU HAVE WON 50 CREDITS & 10 POINTS." The message or instruction may be provided to the player visually, audibly, or through suitable audiovisual displays.

Event 132 represents a third point in time after players A, B and C have each played three games. Players A, B and C each wagered one credit for the third play of the at least one game. At this point in time, the community display 148 of FIG. 4B displays that Player C won an award of two-hundred fifty credits and players A and B won awards of zero credits. The central controller provides Player C with 3 points in addition to the award of two-hundred fifty credits. Player C has 347 credits and has accumulated 43 points. Since Player A or Player B did not win award, the central controller provides players A and B with 20 points. Player A has 147 credits and has accumulated 50 points. Player B has 97 credits and has accumulated 60 points. Because neither Player A, B nor C won an award at least equaling 1000 credits, the event counter increments to three.

Timeline 120 continues as illustrated in FIG. 4C. Event 134 represents a fourth point in time after players A, B and C have each played four games. Players A, B and C each wagered one credit for the fourth play of the at least one game. At this point in time, the community display 150 of FIG. 4C displays that Player B won the designated threshold 122 worth a value of one-thousand credits. Players A and C won awards of zero credits. The central controller provides Player B with 0 points in addition to the designated threshold 122 of one-thousand credits. Since Player B won an award at least equaling 1000 credits, the event counter resets to an initial or reset value. As illustrated in FIG. 4C, the event counter resets to an initial or reset value of zero. At this point in time, Player A has 146 credits and has accumulated 70 points. Player B has 1096 credits and has accumulated zero points. Player C has 346 credits and has accumulated 63 points.

In one such embodiment, if the designated threshold 122 occurs or is met, the central controller resets the point total accumulated by the player or players who achieved the designated event (e.g., the player(s) playing at the gaming device (s) where the designated event occurred). In the embodiment illustrated in FIG. 4C, the central controller resets the quantity of points accumulated by Player B to zero because Player B won the designated threshold 122 of one-thousand credits. In one embodiment, the central controller does not reset the quantity of points accumulated by the player who wins the designated threshold or causes the designated threshold to be met or reached. In one such embodiment, if the designated threshold 122 occurs or is met, the central controller maintains the point total accumulated by each of the players. In another such embodiment, if the designated threshold 122 occurs or is met, the central controller resets the point total accumulated by each of the players. For example, players A, B and C lose the points accumulated prior to Player B winning the designated threshold or prior to Player B causing the designated threshold to be met or reached. In one embodiment, if the designated threshold 122 occurs or is met, the central controller resets the point total accumulated by at least one of the players. For example, since Player B wins the designated threshold, the central controller resets the point total accumulated by Player B to any suitable reset value, such as zero.

In one embodiment, the reset value is a designated number of points added to, or subtracted from, an existing number of points that were accumulated prior to a player winning the designated threshold or prior to a player causing the designated threshold to be met or reached. For example, referring to the embodiment of FIGS. 4B and 4C, Player B accumulated sixty points prior to causing the designated threshold to be met or reached. In this example, after the designated threshold is met or reached, the central controller resets the points accumulated by Player B to ten (e.g., sixty points−fifty points). That is, the reset value is equal to the quantity of points accumulated by the player prior to the designated threshold being met or reached (e.g., sixty points) minus a designated number of points (e.g., fifty points).

Figure 5C:
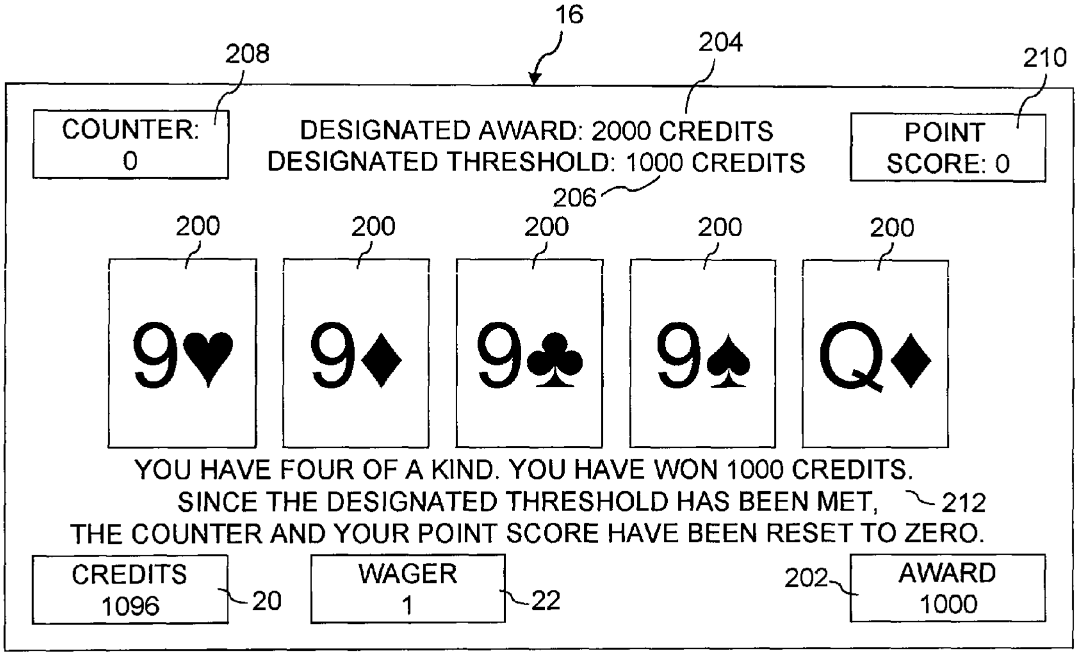

Referring now to FIG. 5C, the display device 16 illustrates an example of a game play screen for Player B in accordance with one embodiment of the gaming system. In the illustrated play of the game, the credit display 20 indicates that Player B has one-thousand-ninety-six credits or other type(s) of currency available for play of the game. The wager display 22 indicates that the player wagered one credit for the illustrated play of the game. The poker hand formed by dealt cards 200 resulted in a combination of a four of a kind. In this embodiment, poker hands resulting in a four of a kind or better are associated with an award at least equal to one thousand credits. The award at least equaling one thousand credits satisfies the designated award threshold indicated by the designated event and threshold display 206. In one embodiment, poker hands resulting in a four of a kind satisfy the designated event which may or may not be indicated by the designated event and threshold display 206.

In the play of the game illustrated in FIG. 5C, the central controller determines that the designated award threshold was met because one of the players, such as Player B, won an award at least equal to one-thousand credits. In another embodiment, it the designated event is an outcome at least equaling a four of a kind, the central controller determines that the designated event occurred because one of the players, such as Player B, achieved an outcome of four nines. As a result, the central controller resets the event counter display 208 to an initial value (e.g., zero). For subsequent plays of the game which do not result in one of the players winning one thousand credits (or achieving another four of a kind), the event counter display 208 will progress from the initial value toward the predetermined number of games or plays of the game (e.g., one-hundred games or plays of the game).

The point or score display 210 displays zero points. In one embodiment, the central controller reset the quantity of points accumulated by the player after the designated event occurs or after the designated award threshold is met. In other embodiments, the central controller enables the player (and/or other players playing at gaming devices in the gaming system) to keep all or some of the points accumulated in previous plays of the game when the designated event occurs or the designated award threshold is met. For example, in accordance with event 134 of FIG. 4C, the point or score display 210 for Player A displays 70 points and the point or score display 210 for Player C displays 63 points.

The award display 202 indicates that the player (e.g., Player B) won one thousand credits. The display device 16 displays an appropriate message or instruction in message or instruction area 212, such as "YOU HAVE FOUR OF A KIND. YOU HAVE WON 1000 CREDITS. SINCE THE DESIGNATED THRESHOLD HAS BEEN MET, THE COUNTER AND YOUR POINT SCORE HAVE BEEN RESET TO ZERO." The message or instruction may be provided to the player visually, audibly, or through suitable audiovisual displays.

Referring back to FIG. 4C, event 136 represents a fifth point in time after players A, B and C have each played five games. Players A, B and C each wagered one credit for the play of the at least one game. At this point in time, the community display 152 of FIG. 4C displays that Player A won an award of two-hundred fifty credits, Player B won an award of zero credits, and Player C won an award of one-hundred credits. The central controller provides 3 points to Player A, 20 points to Player B, and 5 points to Player C. At this point in time, Player A has 395 credits and has accumulated 73 points. Player B has 1095 credits and has accumulated 20 points. Player C has 445 credits and has accumulated 68 points. Because neither Player A, B nor C won an award at least equaling 1000 credits, the event counter increments to three.

Figure 4D:
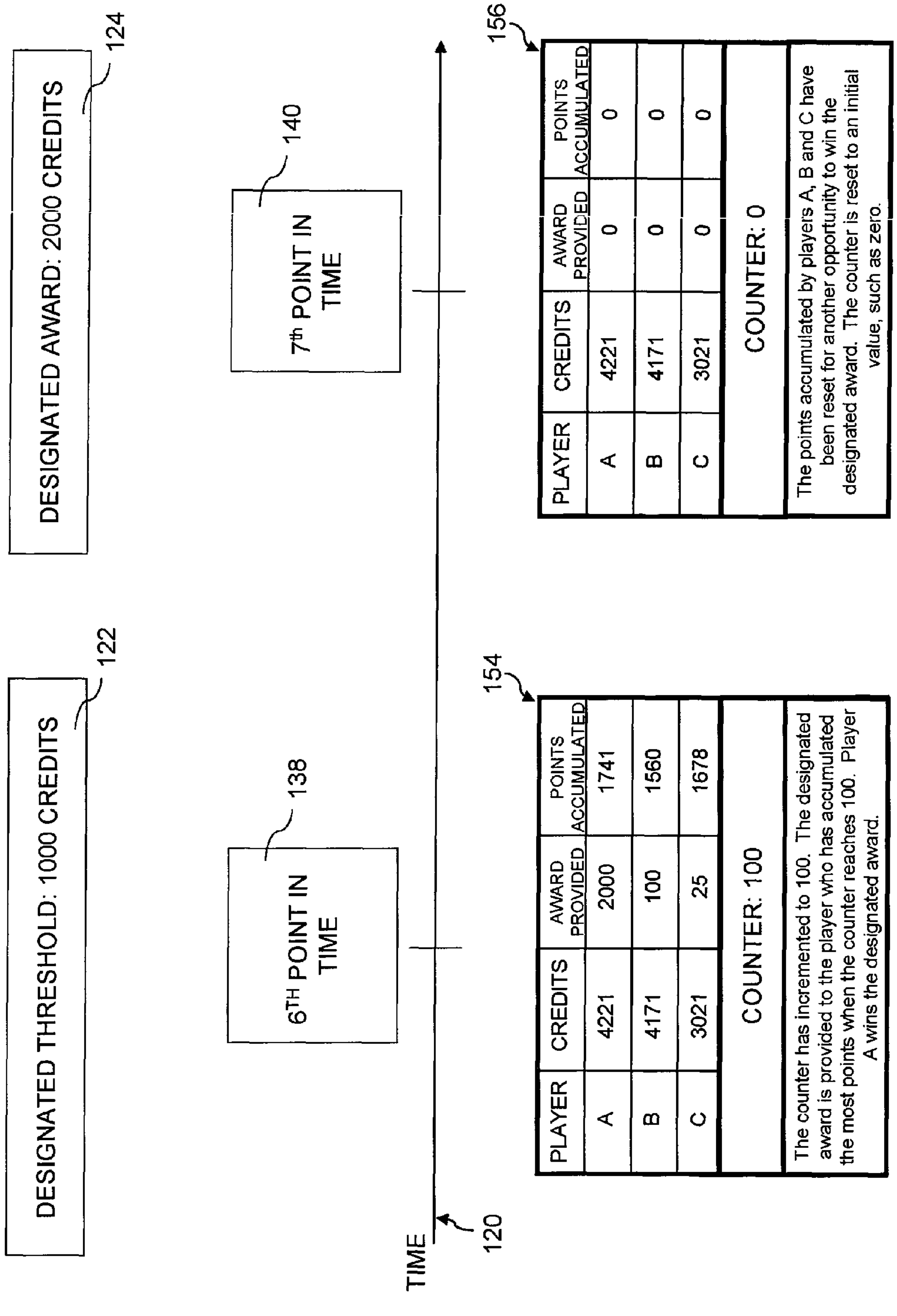

Timeline 120 continues as illustrated in FIG. 4D. Event 138 represents a sixth point in time after players A, B and C began playing at event 126 of FIG. 4A. Players A, B and C each wagered one credit for the one-hundred fourth play of the at least one game. At this point in time, the community display 154 of FIG. 4D displays that the event counter has incremented to one-hundred.

As described above, when the event counter increments to one-hundred, the central controller provides the designated award 124 (e.g., 2000 credits) if the designated event 122 does not occur within a predetermined number of games, such as 100 games. In this embodiment, the central controller provides the designated award 124 (e.g., 2000 credits) to Player A because Player A had accumulated the most points during the tracked plays of the at least one game. As displayed by the community display 154, Player A has 4221 credits and has accumulated 1741 points, Player B has 4171 credits and has accumulated 1560 points, and Player C has 3021 credits and has accumulated 1678 points. In other embodiments, the central controller divides the designated award between the players A, B and/or C as will be described in more detail below.

Timeline 120 continues as illustrated in FIG. 4D. Event 140 represents a seventh point in time. At this point in time, the community display 156 of FIG. 4D displays that Player A has 4221 credits, Player B has 4171 credits and Player C has 3021 credits. It should be appreciated that the central controller has reset the quantity of points accumulated by players A, B and C to zero in the embodiment illustrated in FIG. 4D because the central controller provided the designated award 124 of two-thousand credits. In one embodiment, the central controller does not reset the quantity of points accumulated by the player who wins the designated award 124. In different embodiments, players A, B and C keep or lose any points accumulated after one of the players wins the designated award. In other embodiments, players A, B and C keep or lose some of the points accumulated after one of the players wins the designated award. For example, in event 140 illustrated in FIG. 4D, the central controller may reset the quantity of points accumulated by Player A to zero while maintaining some or all of the points accumulated by players B and C in previous plays or games prior to one of the players winning the designated award.

Figure 5D:
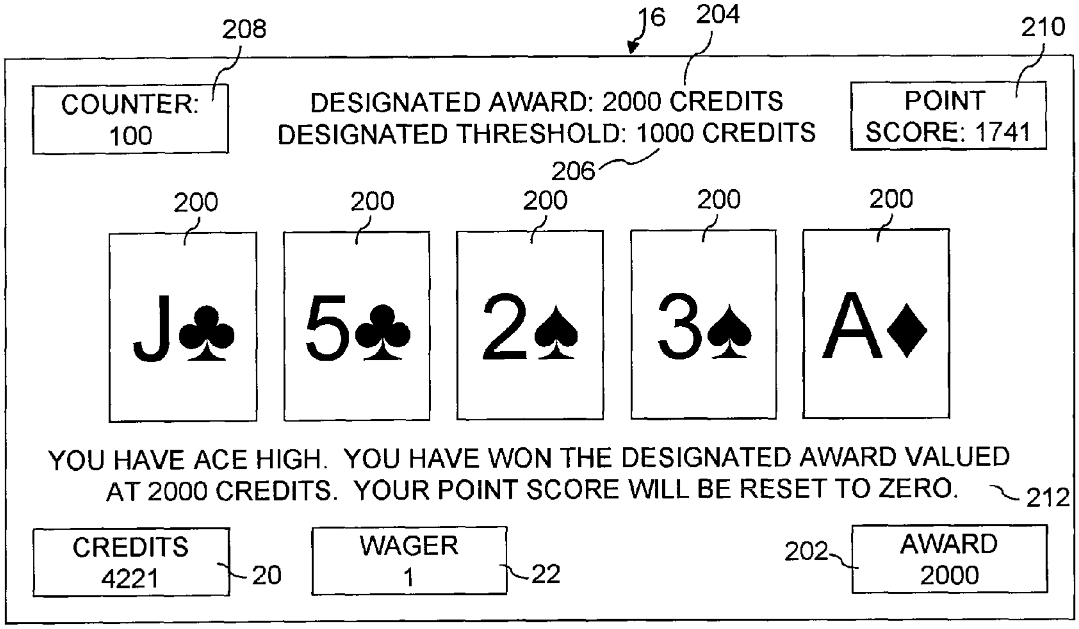

Referring now to FIG. 5D, the display device 16 illustrates an example of a game play screen for Player A in accordance with one embodiment of the gaming system. In the illustrated play of the game, the credit display 20 indicates that Player A has four-thousand-two-hundred-twenty-one credits or other type(s) of currency available for play of the game. The wager display 22 indicates that the player wagered one credit for the illustrated play of the game. The poker hand formed by dealt cards 200 resulted in a combination of ace high.

In the play of the game illustrated in FIG. 5D, the central controller determines that the event counter display 208 has incremented to the predetermined number of games or plays of the game (e.g., one-hundred games or plays of the game). The central controller provides the designated award indicated by the designated award display 204 to one of the players playing at one of the gaming devices in the gaming system. In one embodiment, the central controller determines whether to provide the designated award to one or more of the players based on the amount of points indicated by each player's point or score display 210. In one embodiment, the central controller provides the designated award to the player who accumulated the most points since the last designated award was provided. In the embodiment illustrated in FIG. 5D, the central controller provides the designated award to Player A because Player A has accumulated more points than either Player B or Player C. In another embodiment, the central controller ranks each of the players participating in the game at the gaming devices in the gaming system and provides the designated award based on the player ranking. In one such embodiment, each player ranking is based on the amount of points indicated by the player's point or score display 210.

The point or score display 210 displays one-thousand-seven-hundred-forty-one points, which represents the total amount of points accumulated by Player A. In one embodiment, the central controller resets the quantity of points accumulated by the player after the designated award is provided. In other embodiments, the central controller enables the player (and/or other players playing at gaming devices in the gaming system) to keep all or some of the points accumulated in previous plays of the game after the designated award is provided. In one embodiment, the central controller resets the quantity of points accumulated by the player who is provided the designated award and maintains the quantity of points accumulated by other players who were not provided the designated award.

The award display 202 indicates that Player A has won the designated award indicated by the designated award display 204 (e.g., two thousand credits). The display device 16 displays an appropriate message or instruction in message or instruction area 212, such as "YOU HAVE ACE HIGH. THE COUNTER HAS REACHED 100 GAMES! YOU HAVE WON THE DESIGNATED AWARD VALUED AT 2000 CREDITS. YOUR POINT SCORE WILL BE RESET TO ZERO." The message or instruction may be provided to the player visually, audibly, or through suitable audiovisual displays.

It should be appreciated that the disclosed gaming system and method provide each of a plurality of players playing at a plurality of gaming devices in the gaming system with an opportunity to win an award if a designated event does not occur or if a designated condition is not satisfied. During the opportunity or award attempt, one or more players may face a decision where the outcome of the decision influences the player's chance of winning the award if a designated event does not occur or if a designated condition is not satisfied. For example, if the event counter display 208 indicates ninety-five and the player is dealt three nines on an initial deal of the cards 200, the player is faced with a decision based on: (i) the hand type dealt in the initial deal of the cards 200, (ii) the number of points awarded for each hand type, and (iii) the count of the event counter. In this example, since the event counter is approaching the predetermined number of games played (e.g., one hundred), the player may be influenced to replace one of the nines initially dealt. If the player replaces one of the nines initially dealt, the player reduces his or her chance of achieving a three of a kind or better. As a result, the player most likely will forego an award or at least part of an award by making this decision. On the other hand, the player's decision increases the chances that the event counter will reach the predetermined number of games played (e.g., one hundred), at which time the central controller will provide the designated award if the designated event does not occur or if a designated condition is not satisfied.

Continuing with this example, the player may be influenced to replace two of the nines initially dealt. If the player replaces two of the nines initially dealt, the player increases his or her chances to achieve more points at the cost of being provided less of an award or no award at all. On the other hand, if the player increases his or her amount of points, the player's decision could increase the player's chance of winning the designated award if the designated event does not occur or if a designated condition is not satisfied.

It should be appreciated that the gaming system implementer can set the value of the designated award and the probability of being provided such designated award to be counterbalanced by the probability of the designated event occurring or the designated condition being satisfied within the predetermined number of games played (or the predetermined amount of time). For example, one way such probabilities can be balanced is by offering players different game types with different qualifying conditions (e.g., minimum wager amounts) to qualify for a chance to win the designated award.

Referring to FIGS. 6A, 6B, 6C and 6D, the central controller is configured to divide the designated award 124 amongst two or more players. Chart 220 illustrated in FIG. 6A shows a probability to win the designated award 124 for players A, B and C based on the quantity of points accumulated by each of the players after the event counter reaches the designated threshold. In one embodiment, the central controller determines a probability to win the designated award 124 based on the total number of points accumulated by each player. Player A has accumulated 1741 points of 4979 total points, which represents 35 percent of the total points. Player B has accumulated 1560 points of 4979 total points, which represents 31 percent of the total points. Player C has accumulated 1678 points of 4979 total points, which represents 34 percent of the total points. In one such embodiment, the central controller determines that Player A has a 35 percent chance to win the designated award 124, Player B has a 31 percent chance to win the designated award 124, and Player C has a 34 percent chance to win the designated award 124.

In another embodiment, the central controller determines a probability to win the designated award 124 based on a player ranking associated with the total number of points accumulated by each player after the event counter reaches the designated threshold. For example, Player A has accumulated 1741 points, Player B has accumulated 1560 points, and Player C has accumulated 1678 points. In this example, the central controller ranks Player A first, Player B second, and Player C third based on the total quantity of points accumulated by players A, B and C. In one such embodiment, the central controller determines a probability to win the designated award 124 based on the player's rankings. Each ranking is associated with a probability to win the designated award 124. For example, the first place ranking is associated with a first probability, such as 50 percent, to win the designated award 124, the second place ranking is associated with a second probability, such as 30 percent, to win the designated award 124, and the third place ranking is associated with a third probability, such as 20 percent, to win the designated award 124. In this example, the top three rankings are assigned or have different probabilities to win the designated award 124. In one embodiment, any suitable number of ranked players or rankings may be assigned a probability to win the designated award 124. In another embodiment, each ranked player or ranking may be assigned any suitable probability to win the designated award 124.

It should be appreciated that the gaming system ranks the participating players and associates a player ranking to all of the participating players based on a total number of points accumulated by the participating players after the event counter reaches the designated threshold. Depending upon the embodiment, the central controller associates a probability to win the designated award with at least one of the player rankings. In one embodiment, the central controller associates a probability to win the designated award with the first ranking or the first ranked player. In different embodiments, the probabilities associated with each ranking or ranked player may be the same or different. For example, the first ranking or the first ranked player is associated with a one-hundred percent chance to win the designated award 124. In another embodiment, the central controller associates a probability to win the designated award with a plurality of the rankings or the ranked players. For example, the first ranking or the first ranked player is associated with a forty-five percent chance to win the designated award 124, the second ranking or the second ranked player is associated with a twenty-five percent chance to win the designated award 124, the third ranking or the third ranked player is associated with a fifteen percent chance to win the designated award 124, the fourth ranking or the fourth ranked player is associated with a ten percent chance to win the designated award 124, and the fifth ranking or the fifth ranked player is associated with a five percent chance to win the designated award 124.

Chart 230 illustrated in FIG. 6B shows a relative portion of the designated award 124 won by players A, B and C based on the quantity of points accumulated by each of the players. Player A has accumulated 1741 points of 4979 total points, which represents 35 percent of the total points. Player B has accumulated 1560 points of 4979 total points, which represents 31 percent of the total points. Player C has accumulated 1678 points of 4979 total points, which represents 34 percent of the total points. In one embodiment, the central controller translates the percentage of total number of points accumulated by each player into a relative portion of the designated award 124 won by each of the players. For example, Player A wins 35 percent of the designated award 124 (e.g., 700 credits), Player B wins 31 percent of the designated award 124 (e.g., 620 credits), and Player C wins 34 percent of the designated award 124 (e.g., 680 credits).

It should be appreciated that the gaming system ranks the participating players and associates a player ranking to all of the participating players based on a total number of points accumulated by the participating players. Depending upon the embodiment, the central controller provides a relative portion of the designated award 124 with at least one of the player rankings, and causes a display of such portion to at least one of the players. In one embodiment, the central controller provides one-hundred percent of the designated award 124 with the first ranking or the first ranked player. For example, the first ranking or the first ranked player wins the designated award 124. In another embodiment, the central controller associates a relative portion of the designated award with a plurality of the rankings or the ranked players. The relative portions may be the same or different for each of the rankings or ranked players. For example, the first ranking or the first ranked player is associated with forty-five percent of the designated award 124, the second ranking or the second ranked player is associated with twenty-five percent of the designated award 124, the third ranking or the third ranked player is associated with fifteen percent of the designated award 124, the fourth ranking or the fourth ranked player is associated with ten percent chance of the designated award 124, and the fifth ranking or the fifth ranked player is associated with five percent of the designated award 124.

Chart 240 illustrated in FIG. 6C shows a plurality of groups of players labeled A, B and C. In one embodiment, the central controller groups or ranks all of the active players of the gaming system based on how many plays of games which the designated event did not occur when the event counter reached the designated threshold. In the example illustrated by chart 240, the player or players in Group A have played 320 plays or games for which the designated event did not occur when the event counter reached the designated threshold. In the example illustrated by chart 240, the player or players in Group B have played 275 plays or games for which the designated event did not occur when the event counter reached the designated threshold. In the example illustrated by chart 240, the player or players in Group C have played 185 plays or games for which the designated event did not occur when the event counter reached the designated threshold.

In another embodiment, when the event counter reaches the designated threshold, the central controller groups players who have played different quantities or ranges of plays or games for which the designated event did not occur into different groups. For example, the central controller groups any player who has played 0-50 games for which the designated event did not occur when the event counter reached the designated threshold into group C. In this example, the central controller groups any player who has played 51-150 games for which the designated event did not occur when the event counter reached the designated threshold into Group B. Continuing with this example, the central controller groups any player who has played 151 or more games for which the designated event did not occur when the event counter reached the designated threshold into Group A.

As illustrated by chart 240 of FIG. 6C, the central controller determines whether to provide the designated award to one of the players from one of the groups based on a probability associated with each of the groups. For example, a first group, such as Group A, is associated with a first probability, such as 50%. A second group, such as Group B, is associated with a second probability, such as 30%. A third group, such as Group C, is associated with a third probability, such as 20%. In this example, the central controller determines which player or players of which groups to provide the designated award based on the probabilities. In one such embodiment, the player(s) of each group divide or split the designated award equally. In another embodiment, the player(s) of each group divide or split the designated award based on the relative number of points accumulated by each player. In different embodiments, the determination of how to split the designated award is predetermined, randomly determined, determined based on the player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day), determined by the game operator or gaming establishment or determined based on any other suitable method or criteria.

In one embodiment, the central controller groups all players who have played a number of games relative to a total number of games played since the last designated event occurred. For example, if 500 games have been played since the last designated event has occurred, the central controller would group the players based on how many of the 500 games played each player has played. In this example, a first group includes players who have played at least a first range of the total number of games played (e.g., 350 or more of the 500 plays) and a second group includes players who have played at least a second, different range of the total number of games played (e.g., 150 to 349 of the 500 plays). In this example, players who have not played in at least 150 of the 500 games play do not qualify to play for the designated award. The central controller would determine such players to be inactive players, as described above, who do not qualify to play for the designated award.

In another embodiment, the central controller selects at least one of the groups to be provided the designated award or a portion of the designated award. In one such embodiment, the central controller provides the designated award or a portion of the designated award to one or more players of the selected group. In one embodiment, the central controller determines which player or players of the selected group to provide a portion of the designated award based on a total number of plays played by each player relative to the other players in the selected group.

Chart 250 illustrated in FIG. 6D shows a plurality of teams labeled A, B and C. Each Team A, B and C is associated with a plurality of players. In one embodiment, the central controller associates the players with different teams based on one or more characteristics associated with the players, such as a player tracking status, a geographical location, or an amount wagered. In another embodiment, the central controller groups or assigns the players to teams randomly.

In one embodiment, the central controller groups the players into teams before or as the event counter starts progressing toward the designated threshold. In another embodiment, the central controller groups the players into teams once the event counter reaches the designated threshold. As described above, each player can earn or accumulate points based on different point accumulation events. As each player earns or accumulates points, the points are accumulated for the team with which the player is associated. That is, each team accumulates points as the individual players associated with that team accumulate points.

In one embodiment, the central controller associates a probability to win the designated award with each of the teams A, B and C based on the total number of points accumulated by each team. In one such embodiment, the central controller associates a first probability to win the designated award, such as 50%, with the team which accumulated the most points, a second probability to win the designated award, such as 30%, with the team which accumulated the second most points, and a third probability to win the designated award, such as 20%, with the team which accumulated the third most points.

In the example illustrated by chart 250, Players 1, 2 and 3 of Team A accumulated 180, 120 and 60 points respectively. Team A accumulated 360 points and is associated with a 50% probability to win the designated award. Players 4, 5 and 6 of Team B accumulated 125, 125 and 50 points respectively. Team B accumulated 300 points and is associated with a 30% probability to win the designated award. Players 7, 8 and 9 of Team C each accumulated 80 points. Team C accumulated 240 points and is associated with a 20% probability to win the designated award.

It should be appreciated that the teams may each include different numbers of players or players of different player statuses. It should also be appreciated that the number of teams ranked or associated with a probability to win the designated award can be any suitable number and the probability of winning the designated award associated with each team can be any suitable probability.

In one embodiment, the central controller is programmed to determine which team or teams to provide the designated award based on the probabilities to win the designated award associated with such teams(s). After the central controller determines which team(s) will be provided the designated award, the central controller is programmed to determine how much of the designated award (i.e., a relative portion of the designated award) will be provided to the player(s) of the determined team(s). In one embodiment, the central controller is programmed to provide each player of the determined team(s) a relative portion of the designated award based on the amount of points accumulated by that player relative to the total amount of points accumulated for the team. For example, as illustrated in chart 250 of FIG. 6D, Player 1 accumulated 180 points of the 360 points accumulated by Team A. That is, Player 1 accumulated 50% of the points for Team A. Player 2 has accumulated 33.33% of the points for Team A and Player 3 has accumulated 16.67% of the points for Team A. In this instance, if Team A is provided the designated award, the central controller causes 50% of the designated award to be provided to Player 1, 33.33% of the designated award to be provided to Player 2, and 16.67% of the designated award to be provided to Player 3.

In another embodiment, the central controller is programmed to provide each player of the determined team(s) a relative probability to win the designated award based on the probability associated with the determined team(s). For example, the central controller associates a relative probability to win the designated award with Players 1, 2, and 3 based on the relative number of points accumulated by each player for their respective team. As illustrated in chart 250 of FIG. 6D, Team A has a 50% probability to win the designated award. Player 1 accumulated 50% of the total amount of points for Team A, Player 2 accumulated 33.33% of the points for Team A, and Player 3 accumulated 16.67% of the points for Team A. For example, if team 1 is determined to win, the central controller associates Player 1 with a 50% probability to win the designated award based on the points accumulated by Player 1. In this example, since Team A has a 50% probability to be provided the designated award, and Player 1 has a 50% probability to win the designated award when Team A is determined to be provided the designated award, Player 1 will have a 25% chance to be provided the designated award (i.e., 50% of 50%, or 25%). In this example, Player 2 will have a 16.67% chance to be provided the designated award (i.e., 33.33% of 50%, or 16.67%) and Player 3 will have a 8.34% chance to be provided the designated award (i.e., 16.67% of 50%, or 8.34%).

In one embodiment, the central controller is programmed to determine the rankings of players, groups or teams with a tie-breaker. In one embodiment, the tie-breaker is based on the player status of the players. In another embodiment, the tie-breaker is based on the amounts wagered by the players, groups, or teams. It should be appreciated that the tie-breaker can be determined using any suitable method and based on any suitable factor, such as coin-out or a random determination.

In one embodiment, a plurality of different ranked players, groups or teams are associated with different probabilities to win the designated award based on the player statuses of the ranked players. In one embodiment, a plurality of ranked players having the same quantity of points and different player statuses are associated with different probabilities to win the designated award. For example, if a player having a first player status (e.g., gold) and a player having a second, lower player status (e.g., bronze) have the same quantity of points, the central controller provides the player having the first player status with a higher probability to win the designated award than the player having the second, lower player status.

In one embodiment, a plurality of different ranked players, groups or teams are associated with different relative portions of the designated award based on the player status of the ranked players. In one embodiment, a plurality of ranked players having the same quantity of points and different player statuses are associated with different relative portions of the designated award. For example, if a player having a first player status (e.g., platinum) and a player having a second, lower player status (e.g., silver) have the same quantity of points, the central controller provides the player having the first player status with a higher relative portion of the designated award than the player having the second, lower player status.

In one embodiment, the gaming system identifies each of the players playing at one of the gaming devices via a player tracking system. In certain embodiments, each of the players begins a gaming session by inserting a playing tracking card, providing a pin code, completing a registration process or form, or identifying himself or herself in any other suitable manner. In one embodiment, each of the players' gaming activity is associated with a player account. The central server, the gaming device processor, and/or the player tracking system tracks each of the players' gaming activity at the gaming devices and continuously, or periodically, updates the players' account information in association with the tracked gaming activity. In one embodiment, the quantity of points accumulated by each player and/or any events tracked by the event counter are associated with each of the player's accounts.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

(1) a plurality of gaming machines, each one of the gaming machines including:
  (a) at least one gaming machine processor;
  (b) at least one input device;
  (c) at least one display device; and
  (d) at least one memory device which stores a plurality of instructions, which when executed by the at least one gaming machine processor, cause the at least one gaming machine processor to enable a player to place a wager on a play of a game; and (2) at least one central controller configured to operate with each of the gaming machines to:
  (a) determine whether at least one designated winning event occurs in association with any plays of the games of the gaming machines, the at least one designated winning event being at least one of, but less than all of, a plurality of winning events;
  (b) if the determination is that the at least one designated winning event occurred in association with a play of the game of a first one of the gaming machines:
    (i) modify an event counter, the event counter being associated with:
      (A) each of the gaming machines, and
      (B) a non-occurrence of the at least one designated winning event, and
    (ii) cause a first award for the occurrence of the at least one designated winning event to be displayed to a player of the first one of the gaming machines; and
  (c) if the determination is that the at least one designated winning event did not occur in association with the play of the game of the first one of the gaming machines:
    (i) increment the event counter,
    (ii) determine if the incremented event counter reaches a designated quantity, and
    (iii) if the incremented event counter reaches the designated quantity, cause at least part of a second, different award for the non-occurrence of the at least one designated winning event to be displayed to a player of a second, separate one of the gaming machines regardless of whether the incremented event counter reaches the designated quantity based on any plays of the game of the second, separate one of the gaming machines.

2. The gaming system of claim 1, wherein the at least one controller is configured to repeat (2)(a) to (2)(c) at least once if the incremented event counter has not reached the designated quantity.

3. The gaming system of claim 1, wherein a first portion of the second, different award is provided to the player of the second, separate one of the gaming machines and a second portion of the second, different, award is provided to a player of a third, separate one of the gaming machines.

4. The gaming system of claim 3, wherein the player of the second, separate one of the gaming machines and the player of the third, separate one of the gaming machines are selected based on a quantity of accumulated points.

5. The gaming system of claim 1, wherein the second, different award includes at least one progressive award.

6. The gaming system of claim 1, wherein the player of the second, separate one of the gaming machines is selected based on a quantity of accumulated points.

7. The gaming system of claim 1, wherein, if the determination is that the at least one designated winning event occurred in association with the play of the game of the first one of the gaming machines, the at least one controller is configured to reset the event counter to an initial value.

8. A gaming system comprising:

(1) a plurality of gaming machines, each one of the gaming machines including:
  (a) at least one gaming machine processor;
  (b) at least one input device;
  (c) at least one display device; and
  (d) at least one memory device which stores a plurality of instructions, which when executed by the at least one gaming machine processor, cause the at least one gaming machine processor to enable a player to place a wager on a play of a game; and (2) at least one central controller configured to operate with each of the gaming machines to:
  (a) determine whether at least one designated winning event occurs in association with a predetermined quantity of plays of the games of the gaming machines, the at least one designated winning event being at least one of, but less than all of, a plurality of winning events;
  (b) if the determination is that the at least one designated winning event did not occur in association with the predetermined quantity of plays of the games of the gaming machines, provide a first award for a non-occurrence of the at least one designated winning event to at least one of a first plurality of players of a first plurality of the gaming machines; and
  (c) if the determination is that the at least one designated winning event occurred in association with the predetermined quantity of plays of the games of the gaming machines, provide at least one portion of a second, different award for an occurrence of the at least one designated winning event to at least one of a second plurality of players of the gaming machines.

9. The gaming system of claim 8, wherein the first award includes at least one progressive award.

10. The gaming system of claim 8, wherein the first award is greater than the second, different award.

11. The gaming system of claim 8, wherein the at least one designated winning event includes at least one designated outcome associated with the predetermined quantity of plays of the games of the gaming machines.

12. The gaming system of claim 8, wherein, if the determination is that the at least one designated event occurred in association with the predetermined quantity of plays of the games of the gaming machines, the at least one controller is configured to provide the at least one portion of the second, different award to each of the second plurality of players.

13. A gaming system comprising:

(1) a plurality of gaming machines, each one of the gaming machines including:

(a) at least one gaming machine processor;

(b) at least one input device;

(c) at least one display device; and (d) at least one memory device which stores a plurality of instructions, which when executed by the at least one gaming machine processor, cause the at least one gaming machine processor to enable a player to place a wager on a play of a game; and (2) at least one central controller configured to operate with each of the gaming machines to:

(a) for each of the gaming machines, for each wagered on play of the game of said gaming machine:

(i) determine whether a point accumulation event occurs in association with said wagered on play of the game of said gaming machine, and (ii) if the point accumulation event occurs, accumulate a quantity of points for a player of said gaming machine;

(b) determine whether a designated event occurs in association with a predetermined quantity of plays of the games of the gaming machines; and (c) if the determination is that the designated event did not occur in association with the predetermined quantity of plays of the games of the gaming machines:

(i) for each of the gaming machines, determine a total quantity of points accumulated for a player of said gaming machine for a designated period, (ii) determine at least two of the gaming machines that will each provide a first award for a non-occurrence of the designated event, wherein said determination is based on said determined total quantities of points, and (iii) cause the determined at least two of the gaming machines to each display and provide the first award to the player of said gaming machine.

14. The gaming system of claim 13, wherein if the determination is that the designated event occurred in association with the predetermined quantity of plays of the games of the gaming machines, the at least one central controller is configured to provide a second, different award for an occurrence of the designated event to the player of whichever one of the gaming machines the designated event occurred in association with.

15. The gaming system of claim 13, wherein the first award includes at least one progressive award.

16. The gaming system of claim 14, wherein the second award includes at least one progressive award.

17. A gaming system comprising:

(1) a plurality of gaming machines, each one of the gaming machines including:

(a) at least one gaming machine processor;

(b) at least one input device;

(c) at least one display device; and (d) at least one memory device which stores a plurality of instructions, which when executed by the at least one gaming machine processor, cause the at least one gaming machine processor to enable a player to place a wager on a play of a game; and (2) at least one central controller configured to operate with each of the gaming machines to:

(a) for each of the gaming machines, for each wagered on play of the game of said gaming machines:

(i) determine whether a point accumulation event occurs in association with said wagered on play of said game of said gaming machine, and (ii) if the point accumulation event occurs, accumulate a quantity of points for a player of said gaming machine;

(b) determine whether a designated event occurs in association with a predetermined quantity of plays of the games of the gaming machines; and (c) if the determination is that the designated event did not occur in association with the predetermined quantity of plays of the games of the gaming machines:

(i) determine a quantity of points accumulated for each player of each of said gaming machines for a designated period, and (ii) for a plurality of said gaming machines, cause a portion of a first award for the non-occurrence of the designated event to be displayed and provided, wherein for each of the plurality of said gaming machines, the displayed portion is based on the determined quantity of points accumulated for the player of said gaming machine for the designated period.

18. The gaming system of claim 17, wherein if the determination is that the designated event occurred in association with the predetermined quantity of plays of the games of the gaming machines, the at least one central controller is configured to provide a second, different award for an occurrence of the designated event to the player of whichever one of the gaming machines the designated event occurred in association with.

19. The gaming system of claim 17, wherein the first award includes at least one progressive award.

20. A gaming system comprising:

a plurality of gaming machines, each one of the gaming machines including:

at least one gaming machine processor;

at least one input device;

at least one display device; and at least one memory device which stores a plurality of instructions, which when executed by the at least one gaming machine processor, cause the at least one gaming machine processor to enable a player to place a wager on a play of a game; and at least one central controller configured to operate with each of the gaming machines to:
(a) for each of said gaming machines:
(i) determine whether one of a plurality of different point accumulation events occurs in association with a wagered on play of said game of said gaming machine;
(ii) if a first one of the point accumulation events occurs, accumulate a first quantity of points for a player of said gaming machine; and
(iii) if a second different one of the point accumulation events occurs, accumulate a second, different quantity of points for said player of said gaming machine;
(b) determine whether a designated event occurs in association with a predetermined quantity of plays of the games of the gaming machines; and
(c) if the determination is that the designated event did not occur in association with the predetermined quantity of plays of the games of the gaming machines:
(i) determine a quantity of points accumulated for each player of each of said gaming machines for a designated period,
(ii) determine at least one of the gaming machines to provide a first award for a non-occurrence of the designated event, wherein said determination is based on the determined quantity of points, if any, accumulated for the player of said at least one gaming machine for the designated period, and
(iii) cause the determined at least one gaming machine to display and provide the first award to the player of said at least one gaming machine.

21. The gaming system of claim 20, wherein the second, different quantity of points is greater than the first quantity of points, and the first point accumulation event is associated with a first award value which is greater than a second award value associated with the second, different point accumulation event.

22. The gaming system of claim 20, wherein the second, different quantity of points is greater than the first quantity of points, and the first point accumulation event is associated with a first award value which is less than a second award value associated with the second, different point accumulation event.

23. A gaming system comprising:
a plurality of gaming machines, each one of the gaming machines including:
at least one gaming machine processor;
at least one input device;
at least one display device; and
at least one memory device which stores a plurality of instructions, which when executed by the at least one gaming machine processor, cause the at least one gaming machine processor to enable a player to place a wager on a play of a game; and
at least one central controller configured to operate with each of the gaming machines to:
(a) for each of said gaming machines:
(i) determine whether a point accumulation event occurs in association with a wagered on play of said game of said gaming machine, and
(ii) if the point accumulation event occurs, accumulate a quantity of points for a player of said gaming machine;
(b) determine whether a designated event occurs in association with a predetermined quantity of plays of the games of the gaming machines; and
(c) if the determination is that the designated event did not occur in association with the predetermined quantity of plays of the games of the gaming machines:
(i) determine a quantity of points accumulated for each player of each of said gaming machines for a designated period,
(ii) determine at least one of the gaming machines to provide a first award for a non-occurrence of the designated event, wherein said determination is based on the determined quantity of points, if any, accumulated for the player of said at least one gaming machine relative to a total quantity of points accumulated for all of the players of said gaming machines, and
(iii) cause the determined at least one gaming machine to display and provide the first award to the player of said at least one gaming machine.

24. A gaming system comprising:
a plurality of gaming machines, each one of the gaming machines including:
at least one gaming machine processor;
at least one input device;
at least one display device; and
at least one memory device which stores a plurality of instructions, which when executed by the at least one gaming machine processor, cause the at least one gaming machine processor to enable a player to place a wager on a play of a game; and
at least one central controller configured to operate with each of the gaming machines to:
(a) for each of said gaming machines:
(i) determine whether one of a plurality of different point accumulation events occurs in association with a wagered on play of said game of said gaming machine;
(ii) if a first one of the point accumulation events occurs, accumulate a first quantity of points for a player of said gaming machine; and
(iii) if a second different one of the point accumulation events occurs, accumulate a second quantity of points for the player of said gaming machine;
(b) determine whether a designated event occurs in association with a predetermined quantity of plays of the games of the gaming machines; and
(c) if the determination is that the designated event did not occur in association with the predetermined quantity of plays of the games of the gaming machines:
(i) determine a quantity of points accumulated for each player of each of said gaming machines for a designated period, and
(ii) for a plurality of said gaming machines, cause a portion of a first award for the non-occurrence of the designated event to be displayed and provided, wherein for each of said gaming machines, the displayed portion is based on the determined quantity of points accumulated for the player of said gaming machine for the designated period.

25. The gaming system of claim 24, wherein the second, different quantity of points is greater than the first quantity of points, and the first point accumulation event is associated with a first award value which is greater than a second award value associated with the second, different point accumulation event.

26. The gaming system of claim 24, wherein the second, different quantity of points is greater than the first quantity of points, and the first point accumulation event is associated with a first award value which is less than a second award value associated with the second, different point accumulation event.

* * * * *

UNITED STATES PATENT AND TRADEMARK OFFICE

CERTIFICATE OF CORRECTION

PATENT NO. : 8,177,633 B2
APPLICATION NO. : 12/191859
DATED : May 15, 2012
INVENTOR(S) : Anthony J. Baerlocher et al.

It is certified that error appears in the above-identified patent and that said Letters Patent is hereby corrected as shown below:

In Claim 2, Column 48, Line 17, after “one” insert --central--.
In Claim 7, Column 48, Line 38, between “one” and “controller” insert --central--.
In Claim 12, Column 49, Line 15, between “designated” and “event” insert --winning--.
In Claim 12, Column 49, Line 17, between “one” and “controller” insert --central--.
In Claim 16, Column 50, Line 3, after “second” add --, different--.
In Claim 17, Column 50, about Lines 19 and 20, replace “said gaming machines” with --said gaming machine--.
In Claim 25, Column 52, about Line 55, delete “, different”.
In Claim 26, Column 52, about Line 61, delete “, different”.

Signed and Sealed this
Tenth Day of July, 2012

David J. Kappos

*Director of the United States Patent and Trademark Office*